US010419140B2

(12) United States Patent
Bae et al.

(10) Patent No.: US 10,419,140 B2
(45) Date of Patent: *Sep. 17, 2019

(54) TRANSMITTING APPARATUS AND RECEIVING APPARATUS AND CONTROLLING METHOD THEREOF

(71) Applicant: SAMSUNG ELECTRONICS CO., LTD., Suwon-si (KR)

(72) Inventors: Jae-hyeon Bae, Seoul (KR); Young-ho Oh, Suwon-si (KR); Sung-hee Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/032,618

(22) Filed: Jul. 11, 2018

(65) Prior Publication Data
US 2018/0323889 A1 Nov. 8, 2018

Related U.S. Application Data

(63) Continuation of application No. 15/288,848, filed on Oct. 7, 2016, now Pat. No. 10,050,730, which is a
(Continued)

(30) Foreign Application Priority Data

Feb. 4, 2016 (KR) .................. 10-2016-0014351

(51) Int. Cl.
*H04L 5/00* (2006.01)
*H04H 20/20* (2008.01)
(Continued)

(52) U.S. Cl.
CPC ........... *H04H 20/20* (2013.01); *H04L 5/0007* (2013.01); *H04L 27/2602* (2013.01);
(Continued)

(58) Field of Classification Search
CPC ... H04L 1/0071; H04L 1/0057; H04L 1/0058; H04L 1/0045; H04L 27/2602;
(Continued)

(56) References Cited

U.S. PATENT DOCUMENTS 9,503,229 B2 * 11/2016 Bae .................. H04L 5/0007
10,050,730 B2 * 8/2018 Bae .................. H04L 5/0007
(Continued)

FOREIGN PATENT DOCUMENTS

EP 2 200 205 A1 6/2010

OTHER PUBLICATIONS

Search Report dated Jul. 11, 2016 issued by the International Searching Authority in counterpart International Patent Application No. PCT/KR2016/001500 (PCT/ISA/210).
(Continued)

Primary Examiner — Emmanuel Bayard
(74) Attorney, Agent, or Firm — Sughrue Mion, PLLC

(57) ABSTRACT

A transmitting apparatus is provided. The transmitting apparatus includes: a frame generator configured to generate a frame including a plurality of orthogonal frequency-division multiplexing (OFDM) symbols; and a guard interval (GI) inserter configured to insert GIs into the generated frame, wherein the plurality of OFDM symbols are divided into a bootstrap, a preamble, and a payload, and the GI inserter inserts first GIs having a size corresponding to a fast Fourier transform (FFT) size of each of OFDM symbols configuring the payload into front ends of each of the OFDM symbols, inserts second GIs having a size corresponding to a quotient obtained by dividing an extra region of the payload calculated based on the FFT size of the OFDM symbols configuring the payload, the number of OFDM symbols, and the size of the first GIs by the number of OFDM symbols into front ends of each of the first GIs, and inserts a cyclic postfix
(Continued)

(CP) having a size corresponding to the remainder remaining after dividing the extra region of the payload by the number of OFDM symbols into a rear end of a final OFDM symbol configuring the payload.

10 Claims, 29 Drawing Sheets

Related U.S. Application Data continuation of application No. 15/044,266, filed on Feb. 16, 2016, now Pat. No. 9,503,229.

(60) Provisional application No. 62/115,846, filed on Feb. 13, 2015.

(51) Int. Cl.
*H04L 27/26* (2006.01)
*H04L 29/06* (2006.01)

(52) U.S. Cl.
CPC ........ *H04L 27/265* (2013.01); *H04L 27/2607* (2013.01); *H04L 27/2608* (2013.01); *H04L 69/22* (2013.01)

(58) Field of Classification Search
CPC ............. H04L 27/2628; H04L 27/2656; H04L 5/0007; H04L 27/2605; H04L 27/2607
USPC .................................................. 375/260, 295
See application file for complete search history.

(56) References Cited

U.S. PATENT DOCUMENTS

| 2010/0061223 | A1 | 3/2010 | Kim et al. |
| 2011/0038249 | A1 | 2/2011 | Tamaki et al. |
| 2013/0219431 | A1 | 8/2013 | Hong et al. |
| 2014/0105328 | A1 | 4/2014 | Ko et al. |
| 2014/0380135 | A1 | 12/2014 | Hong et al. |
| 2015/0256375 | A1 | 9/2015 | Asjadi |
| 2015/0304070 | A1 | 10/2015 | Baek |
| 2015/0358106 | A1 | 12/2015 | Limberg |
| 2016/0072732 | A1 | 3/2016 | Hong |
| 2016/0197759 | A1 | 7/2016 | Baek et al. |
| 2016/0373221 | A1* | 12/2016 | Michael ................ H04L 5/0044 |
| 2017/0222854 | A1 | 8/2017 | Baek et al. |
| 2018/0213270 | A1* | 7/2018 | Ng ........................ H04N 21/242 |

OTHER PUBLICATIONS

Written Opinion dated Jul. 11, 2016 issued by the International Searching Authority in counterpart International Patent Application No. PCT/KR2016/001500 (PCT/ISA/237).

\* cited by examiner

TRANSMITTING APPARATUS AND RECEIVING APPARATUS AND CONTROLLING METHOD THEREOF

CROSS-REFERENCE TO RELATED APPLICATIONS

This is a continuation of U.S. application Ser. No. 15/288,848 filed Oct. 7, 2016, which is a continuation of application Ser. No. 15/044,266 filed Feb. 16, 2016, which claims priority from U.S. Provisional Application No. 62/115,846, filed on Feb. 13, 2015, and Korean Patent Application No. 10-2016-0014351, filed on Feb. 4, 2016, in the Korean Intellectual Property Office, respectively, the disclosures of which are incorporated herein in their entirety by reference.

BACKGROUND

1. Field

Apparatuses and methods consistent with the exemplary embodiments relate to a transmitting apparatus, a receiving apparatus, and a signaling method thereof, which transmit data by mapping the data to at least one signal processing path.

2. Description of the Related Art

In the information-oriented society of the 21st century, broadcasting communication services are entering an era of digitization, multi-channel, broadband, and high quality. In particular, as high-quality digital television (TV), portable multimedia players (PMP), and portable broadcasting apparatuses have been increasingly used in recent years, even in digital broadcasting services, a demand for supporting various receiving methods has been increased.

In an actual state in which the standard group has established various standards according to demands to provide various services to satisfy user's needs, it is required to find methods for providing better services having improved performance.

SUMMARY

The present disclosure provides a transmitting apparatus distributing and disposing an extra region of a payload, a receiving apparatus, and a controlling method thereof.

According to an aspect of the present disclosure, a transmitting apparatus includes: a frame generator configured to generate a frame including a plurality of orthogonal frequency-division multiplexing (OFDM) symbols; and a guard interval (GI) inserter configured to insert GIs into the generated frame, wherein the plurality of OFDM symbols are divided into a bootstrap, a preamble, and a payload, and the GI inserter inserts first GIs having a size corresponding to a fast Fourier transform (FFT) size of each of OFDM symbols configuring the payload into front ends of each of the OFDM symbols, inserts second GIs having a size corresponding to a quotient obtained by dividing an extra region of the payload calculated based on the FFT size of the OFDM symbols configuring the payload, the number of OFDM symbols, and the size of the first GIs by the number of OFDM symbols into front ends of each of the first GIs, and inserts a cyclic postfix (CP) having a size corresponding to the remainder remaining after dividing the extra region of the payload by the number of OFDM symbols into a rear end of a final OFDM symbol configuring the payload.

The CP may include portions of the final OFDM symbol configuring the payload.

The first and second GIs may include portions of each of the OFDM symbols.

The CP may include samples from a start point of the final OFDM symbol to a point corresponding to a size of the remainder, among a plurality of samples configuring the final OFDM symbol.

The first and second GIs may include samples from a final point of the OFDM symbol to a point corresponding to the sum of a size corresponding to the FFT size of the OFDM symbol and a size of the quotient, among a plurality of samples configuring the OFDM symbol.

The GI inserter may generate information on whether the extra region of the payload is distributed and a disposition reference of the extra region.

The transmitting apparatus may further include a transmitter configured to transmit the frame including the generated information.

According to another aspect of the present disclosure, a receiving apparatus includes: a receiver configured to receive a stream including a frame including a bootstrap, a preamble, and a payload; a bootstrap detector configured to detect the bootstrap in the frame; and a signal processor configured to signal-process the preamble based on the detected bootstrap and signal-process the payload based on the signal-processed preamble, wherein first GIs having a size corresponding to an FFT size of each of OFDM symbols configuring the payload are inserted into front ends of each of the OFDM symbols, second GIs having a size corresponding to a quotient obtained by dividing an extra region of the payload calculated based on the FFT size of the OFDM symbols configuring the payload, the number of OFDM symbols, and the size of the first GIs by the number of OFDM symbols are inserted into front ends of each of the first GIs, and a cyclic postfix (CP) having a size corresponding to the remainder remaining after dividing the extra region of the payload by the number of OFDM symbols is inserted into a rear end of a final OFDM symbol configuring the payload.

The signal processor may signal-process the payload based on information on whether the extra region of the payload is distributed and a disposition reference of the extra region, included in the bootstrap and the preamble.

The signal processor may perform channel estimation based on the CP inserted into the rear end of the final OFDM symbol.

According to still another aspect of the present disclosure, a controlling method of a transmitting apparatus includes: generating a frame including a plurality of OFDM symbols; and inserting GIs into the generated frame, wherein the plurality of OFDM symbols are divided into a bootstrap, a preamble, and a payload, and in the inserting, first GIs having a size corresponding to an FFT size of each of OFDM symbols configuring the payload are inserted into front ends of each of the OFDM symbols, second GIs having a size corresponding to a quotient obtained by dividing an extra region of the payload calculated based on the FFT size of the OFDM symbols configuring the payload, the number of OFDM symbols, and the size of the first GIs by the number of OFDM symbols are inserted into front ends of each of the first GIs, and a cyclic postfix (CP) having a size corresponding to the remainder remaining after dividing the extra region of the payload by the number of OFDM symbols is inserted into a rear end of a final OFDM symbol configuring the payload.

The CP may include portions of the final OFDM symbol configuring the payload.

The first and second GIs may include portions of each of the OFDM symbols.

The CP may include samples from a start point of the final OFDM symbol to a point corresponding to a size of the remainder, among a plurality of samples configuring the final OFDM symbol.

The first and second GIs may include samples from a final point of the OFDM symbol to a point corresponding to the sum of a size corresponding to the FFT size of the OFDM symbol and a size of the quotient, among a plurality of samples configuring the OFDM symbol.

In the inserting, information on whether the extra region of the payload is distributed and a disposition reference of the extra region may be generated.

The controlling method of a transmitting apparatus may further include transmitting the frame including the generated information.

According to yet still another aspect of the present disclosure, a controlling method of a receiving apparatus includes: receiving a stream including a frame including a bootstrap, a preamble, and a payload; detecting the bootstrap in the frame; and signal-processing the preamble based on the detected bootstrap and signal-processing the payload based on the signal-processed preamble, wherein first GIs having a size corresponding to an FFT size of each of OFDM symbols configuring the payload are inserted into front ends of each of the OFDM symbols, second GIs having a size corresponding to a quotient obtained by dividing an extra region of the payload calculated based on the FFT size of the OFDM symbols configuring the payload, the number of OFDM symbols, and the size of the first GIs by the number of OFDM symbols are inserted into front ends of each of the first GIs, and a cyclic postfix (CP) having a size corresponding to the remainder remaining after dividing the extra region of the payload by the number of OFDM symbols is inserted into a rear end of a final OFDM symbol configuring the payload.

In the signal-processing, the payload may be signal-processed based on information on whether the extra region of the payload is distributed and a disposition reference of the extra region, included in the bootstrap and the preamble.

In the signal-processing, channel estimation may be performed based on the CP inserted into the rear end of the final OFDM symbol.

According to yet still another aspect of the present disclosure, a transmitting apparatus includes a processor configured to: generate a frame comprising orthogonal frequency-division multiplexing (OFDM) symbol, the OFDM symbols comprising a payload; insert first guard intervals (GIs) into the frame; insert second GIs into the frame; and insert a cyclic postfix (CP) into a rear end of a final OFDM symbol configuring the payload; and a transmitter configured to transmit information from the processor, wherein the first GIs are sized according to a fast Fourier transform (FFT) size of the OFDM symbols configuring the payload, the second GIs are sized according to a quotient obtained by dividing an extra region of the payload, the number of OFDM symbols, and the size of the first GIs by the number of OFDM symbols, and the CP is sized according to a remainder resulting from the dividing.

The OFDM symbols may have the same size.

The OFDM symbols may include a first OFDM symbol having a first size and a second OFDM symbol having a second size different from the first size.

As set forth above, according to various exemplary embodiments, the remaining region of the payload is efficiently used, thereby making it possible to improve data processing efficiency.

DESCRIPTION

Hereinafter, various exemplary embodiments will be described in detail with reference to the accompanying drawings. Further, in the following description, a detailed explanation of known related functions or configurations may be omitted to avoid unnecessarily obscuring the subject matter. In addition, terms to be described below may vary according to a user's and an operator's intentions, the convention, or the like as terms defined by considering functions. Therefore, the definition should be made according to the contents throughout this specification.

An apparatus and a method proposed in the exemplary embodiments can be, of course, applied to various communication systems including mobile broadcasting services including a digital multimedia broadcasting (DMB) service, digital video broadcasting handheld (DVB-H), an advanced television systems committee mobile/handheld (ATSC-M/H) service, an Internet protocol television (IPTV), and the like, communication systems including a moving picture experts group (MPEG) media transport (MMT) system, an evolved packet system (EPS), a long-terms evolution (LTE) mobile communication system, a long-term evolution-advanced (LTE-A) mobile communication system, a high speed downlink packet access (HDSPA) mobile communication system, a high speed uplink packet access (HSUPA) mobile communication system, a 3rd generation project partnership 2 (3GPP2) high rate packet data (HRPD) mobile communication system, a 3GPP2 wideband code division multiple access (WCDMA) mobile communication system, a 3GPP2 code division multiple access (CDMA) mobile communication system, an Institute of Electrical and Electronics Engineers (IEEE) 802.16m communication system, a mobile Internet protocol (Mobile IP) system, and the like.

Figure 1:
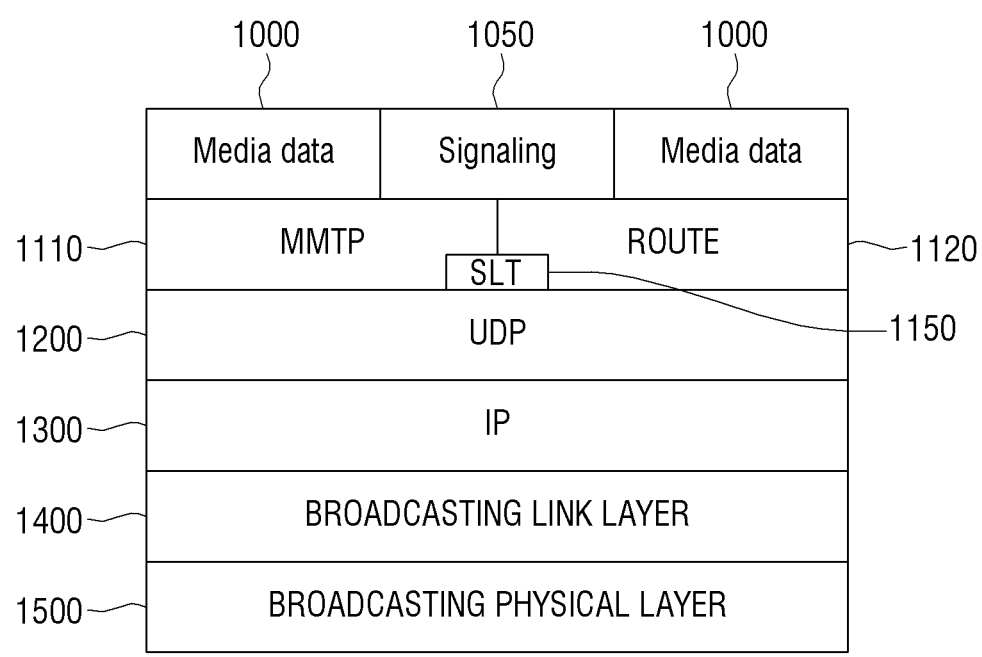
FIG. 1 is a diagram illustrating a hierarchical structure of a transmitting system according to an exemplary embodiment.

FIG. 1 is a diagram illustrating a hierarchical structure of a transmitting system according to an exemplary embodiment.

Referring to FIG. 1, a service includes media data 1000 and signaling 1050 for transferring information required to acquire and consume the media data at a receiver. The media data may be encapsulated in a format suitable for transmission prior to the transmission. An encapsulation method may follow a Media Processor (MPU) defined in ISO/IEC 23008-1 MPEG Media Transport (MMT) or a DASH segment format defined in ISO/IEC 23009-1 Dynamic Adaptive Streaming over HTTP (DASH). The media data 1000 and the signaling 1050 are packetized according to an application layer protocol.

FIG. 1 illustrates a case in which an MMT protocol (MMTP) 1110 defined in the MMT and a Real-Time Object Delivery over Unidirectional Transport (ROUTE) protocol 1120 are used as the application layer protocol. In this case, a method for notifying information about an application protocol, in which a service is transmitted, by an independent method different from the application layer protocol is required for the receiver to know by which application layer protocol the service is transmitted.

A service list table (SLT) 1150 illustrated in FIG. 1 represents or indicates a signaling method and packetizes information about the service in a table for satisfying the aforementioned object. Detailed contents of the SLT will be described below. The packetized media data and the signaling including the SLT are transferred to a broadcasting link layer 1400 through a user datagram protocol (UDP) 1200 and an Internet protocol (IP) 1300. An example of the broadcasting link layer 1400 includes an ATSC 3.0 link-layer protocol (ALP) defined in the ATSC 3.0 standard (hereafter, referred to as ' ATSC 3.0'). The ALP protocol generates an ALP packet by using an IP packet as an input, and transfers the ALP packet to a broadcasting physical layer 1500.

However, according to FIG. 2 to be described below, it is noted that the broadcasting link layer 1400 does not use only the IP packet 1300 including the media data and/or the signaling as the input, and instead, may use an MPEG2-TS packet or general formatted packetized data as the input. In this case, signaling information required to control the broadcasting link layer is also transferred to the broadcasting physical layer 1500 in the form of the ALP packet.

The broadcasting physical layer 1500 generates a physical layer frame by signal-processing the ALP packet as the input, converts the physical layer frame into a radio signal, and transmits the radio signal. In this case, the broadcasting physical layer 1500 has at least one signal processing path. An example of the signal processing path may include a physical layer pipe (PLP) of ATSC 3.0 or the Digital Video Broadcasting-Second Generation Terrestrial (DVB-T2) standard, and one or more services or some of the services may be mapped to the PLP.

Figure 2:
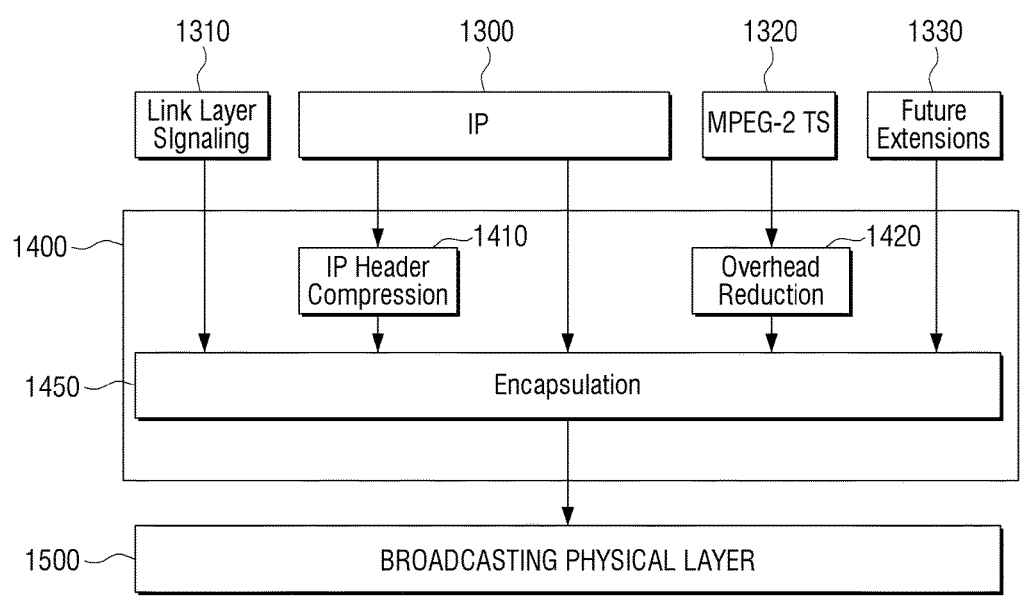
FIG. 2 is a diagram illustrating a schematic configuration of the broadcasting link layer 1400, according to an exemplary embodiment.

FIG. 2 is a diagram illustrating a schematic configuration of the broadcasting link layer 1400, according to an exemplary embodiment.

Referring to FIG. 2, the input of the broadcasting link layer 1400 includes the IP packet 1300, and may further include link layer signaling 1310, an MPEG2-TS packet 1320, and other packetized data 1330.

Input data may be subjected to additional signal processing based on the type of the input data before ALP packetization 1450. As an example of the additional signal processing, the IP packet 1300 may be subjected to an IP header compression process 1410 and the MPEG2-TS packet may be subjected to an overhead reduction process 1420. During the ALP packetization, input packets may be subjected to dividing and merging processes.

Figure 3A:
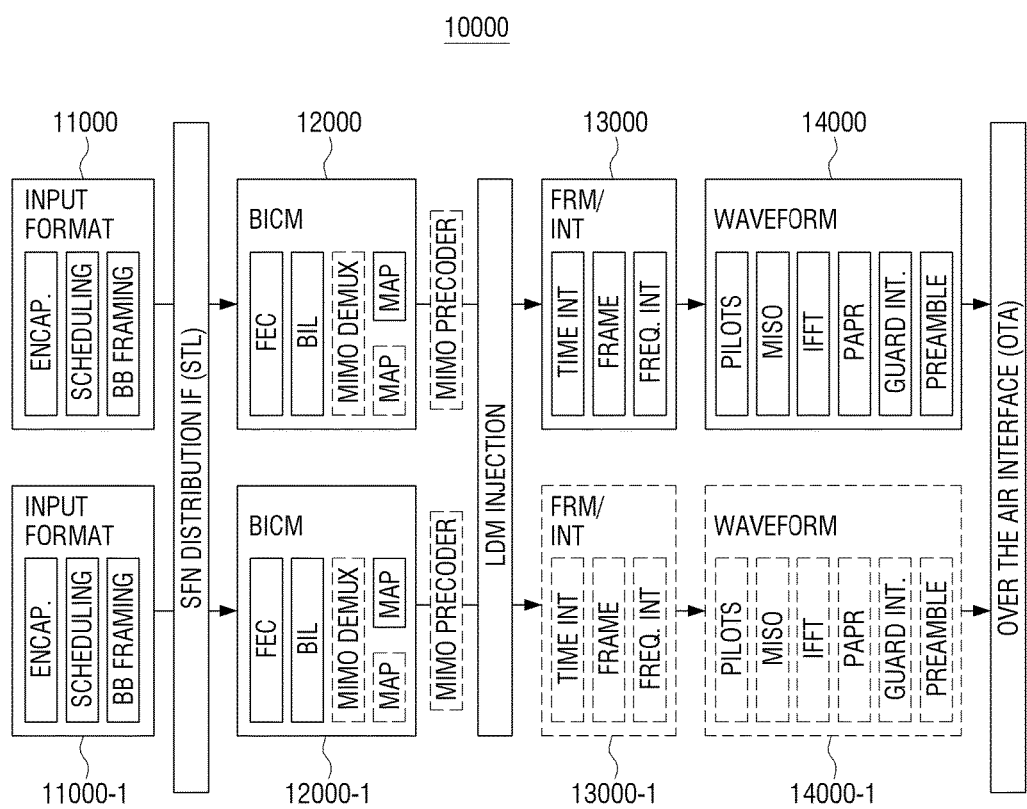
FIG. 3A is a diagram illustrating a schematic configuration of a transmitting system or a transmitting apparatus, according to an exemplary embodiment.

FIG. 3A is a diagram illustrating a schematic configuration of a transmitting system or a transmitting apparatus, according to an exemplary embodiment. According to FIG. 3A, a transmitting system 10000 according to the exemplary embodiment may include input formatting blocks 11000 and 11000-1, bit interleaved and coded modulation (BICM) blocks 12000 and 12000-1, framing/interleaving blocks 13000 and 13000-1, and waveform generation blocks 14000 and 14000-1.

The input formatting blocks 11000 and 11000-1 generate a baseband packet from an input stream of data to be serviced. Herein, the input stream may be a transport stream (TS), Internet packets (IP) (e.g., IPv4 and IPv6), an MPEG media transport (MMT), a generic stream (GS), generic stream encapsulation (GSE), and the like. For example, an ATSC 3.0 link-layer protocol (ALP) packet may be generated based on the input stream, and the baseband packet may be generated based on the generated ALP packet.

The bit interleaved and coded modulation (BICM) blocks 12000 and 12000-1 determine an forward error correction (FEC) coding rate and a constellation order according to an area (fixed PHY frame or mobile PHY frame) to which the data to be serviced will be transmitted, and perform encoding and time interleaving. Signaling information about the data to be serviced may be encoded through a separate BICM encoder according to user implementation or encoded by sharing a BICM encoder with the data to be serviced.

The framing/interleaving blocks 13000 and 13000-1 combine the time-interleaved data with a signaling signal including the signaling information from a signaling block 15000 to generate a transmission frame.

The waveform generation blocks 14000 and 14000-1 generate an orthogonal frequency-division multiplexing (OFDM) signal in a time domain for the generated transmission frame, modulate the generated OFDM signal into an RF signal, and transmit the RF signal to a receiver.

The transmitting system 10000 according to the exemplary embodiment illustrated in FIG. 3A includes normative blocks marked with a solid line and informative blocks marked with dotted lines. Herein, the blocks marked with the solid line are normal blocks, and the blocks marked with the dotted lines are blocks which may be used when informative multiple-input multiple-output (MIMO) is implemented.

Figure 3B:
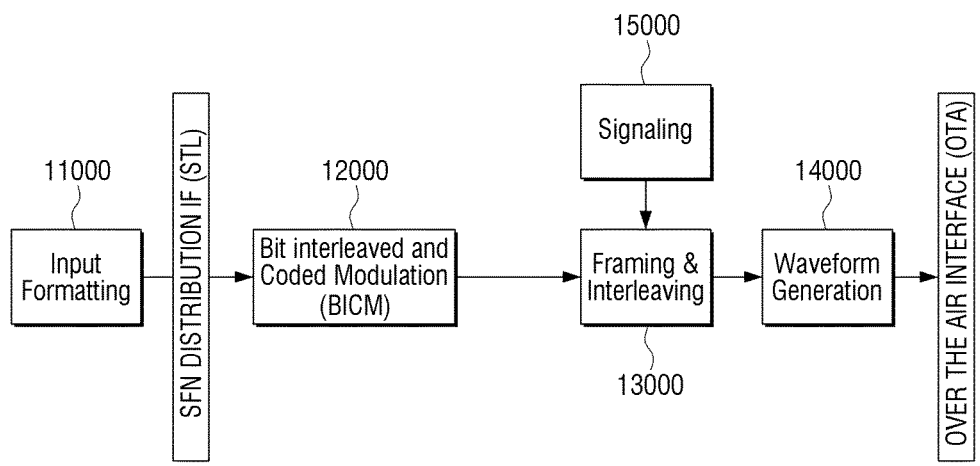
FIGS. 3B and 3C are diagrams illustrating a multiplexing method, according to exemplary embodiments.
Figure 3C:
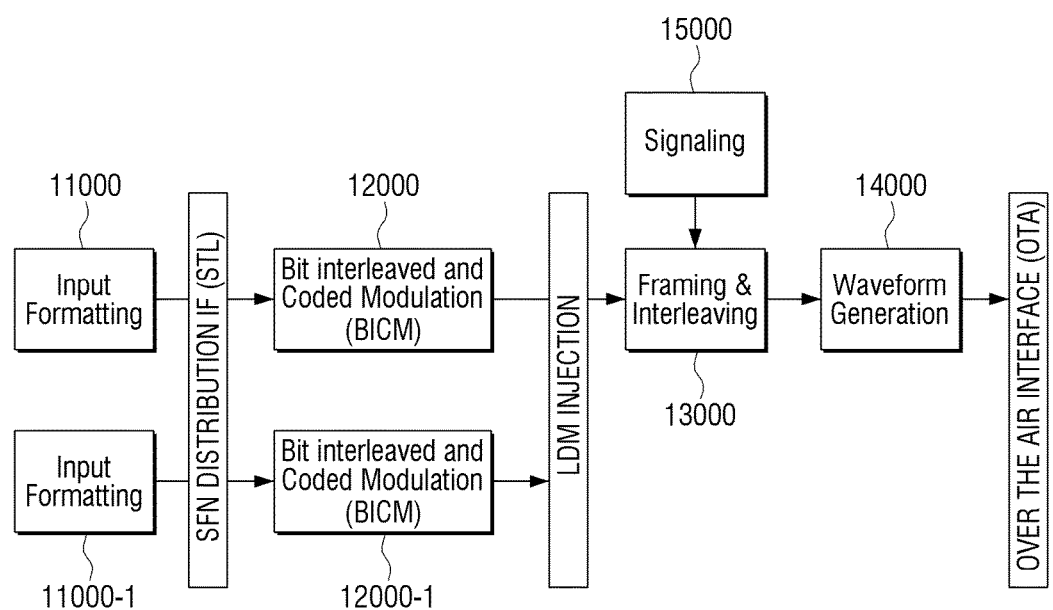

FIGS. 3B and 3C are diagrams illustrating a multiplexing method, according to exemplary embodiments.

FIG. 3B illustrates a block diagram for implementing time division multiplexing (TDM), according to an exemplary embodiment.

A TDM system architecture includes four main blocks (alternatively, parts) of the input formatting block 11000, the BICM block 12000, the framing/interleaving block 13000, and the waveform generation block 14000. This TDM system architecture also includes a signalling block 15000.

Data is input and formatted in the input formatting block 11000 and forward error correction is applied the data in the BICM block 12000. Next, the data is mapped to a constellation. Subsequently, the data is time and frequency-interleaved in the framing/interleaving block 13000 and a frame is generated. Thereafter, an output waveform is generated in the waveform generation block 14000.

FIG. 3C illustrates a block diagram for implementing layered division multiplexing (LDM), according to an exemplary embodiment.

An LDM system architecture includes several other blocks as compared with the TDM system architecture. In detail, two separated input formatting blocks 11000 and 11000-1 and the BCIM blocks 12000 and 12000-1 for one of respective layers of the LDM are included in the LDM system architecture. The blocks are combined in an LDM injection block before the framing/interleaving block 13000. And, the waveform generation block 14000 and the signalling block are similar to the TDM system.

Figure 4:
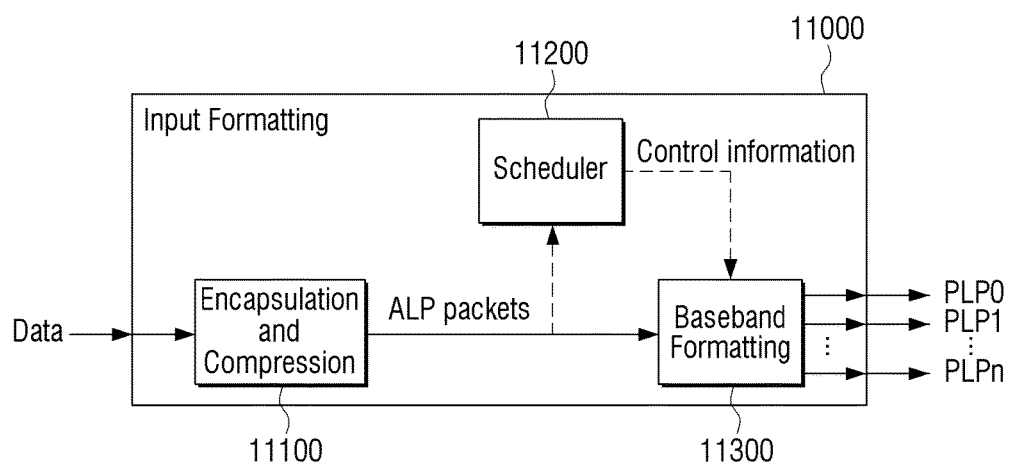
FIG. 4 is a block diagram illustrating a detailed configuration of the input formatting block illustrated in FIG. 3A.

FIG. 4 is a block diagram illustrating a detailed configuration of the input formatting block illustrated in FIG. 3A, according to an exemplary embodiment.

As illustrated in FIG. 4, the input formatting block 11000 includes three blocks that control packets distributed to PLPs. In detail, the input formatting block 11000 includes an encapsulation and compression block 11100, a baseband formatting block (alternatively, baseband framing block) 11300, and a scheduler block 11200.

An input stream input to the encapsulation and compression block 11100 may be various types. For example, the input stream may be a transport stream (TS), an Internet packets (IP) (e.g., IPv4 and IPv6), an MPEG media transport (MMT), a generic stream (GS), a generic stream encapsulation (GSE), and the like.

Packets output from the encapsulation and compression block 11100 become ALP packets (generic packets) (also referred to as L2 packets). Herein, a format of an ALP packet may be one of the Type Length Value (TLV), the GSE, and the ALP.

The length of each ALP packet is variable. The length of the ALP packet may be easily extracted from the ALP packet itself without additional information. The maximum length of the ALP packet is 64 kB. The maximum length of a header of the ALP packet is 4 bytes. The ALP packet has a length of integer bytes.

The scheduler block 11200 receives an input stream including the encapsulated ALP packets to form physical layer pipes (PLPs) in a baseband packet form. In the TDM system, only one PLP called a single PLP (S-PLP) or multiple PLPs (M-PLP) may be used. One service may not use four or more PLPs. In the LDM system constituted by two layers, one in each layer, that is, two PLPs are used.

The scheduler block 11200 receives the encapsulated ALP packets to designate how the encapsulated ALP packets are allocated to physical layer resources. In detail, the scheduler block 11200 designates how the baseband formatting block 1130 outputs a baseband packet.

A function of the scheduler block 11200 is defined by a data size and a time. A physical layer may transmit some of data in the distributed time. The scheduler block 11200 generates a solution which is suitable in terms of a configuration of a physical layer parameter by using inputs and information such as constraints and configuration from an encapsulated data packet, the quality of service metadata for the encapsulated data packet, a system buffer model, and system management. The solution is targets of a configuration and a control parameter which are usable and an aggregate spectrum.

An operation of the scheduler block 11200 is constrained to a set of dynamic, quasi-static, and static components. Definition of the constraint may vary according to user implementation.

Further, a maximum of four PLPs may be used with respect to each service. A plurality of services which include a plurality of types of interleaving blocks may be implemented by up to a maximum of 64 PLPs with respect to a bandwidth of 6, 7, or 8 MHz.

Figure 5A:
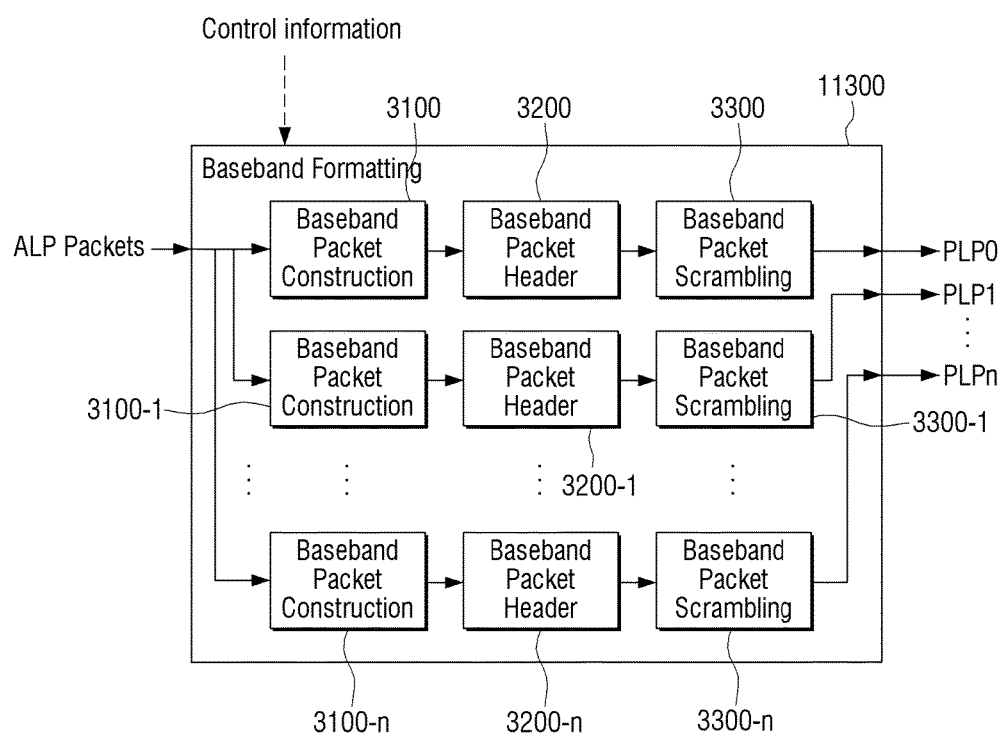
FIGS. 5A and 5B are diagrams illustrating a detailed configuration of the baseband framing block.

The baseband formatting block 11300 includes baseband packet construction blocks 3100, 3100-1, . . . 3100-n, baseband packet header construction blocks 3200, 3200-1, . . . , 3200-n, and baseband packet scrambling blocks 3300, 3300-1, . . . , 3300-n, as illustrated in FIG. 5A. In an M-PLP operation, the baseband formatting block generates a plurality of PLPs as necessary.

Figure 5B:
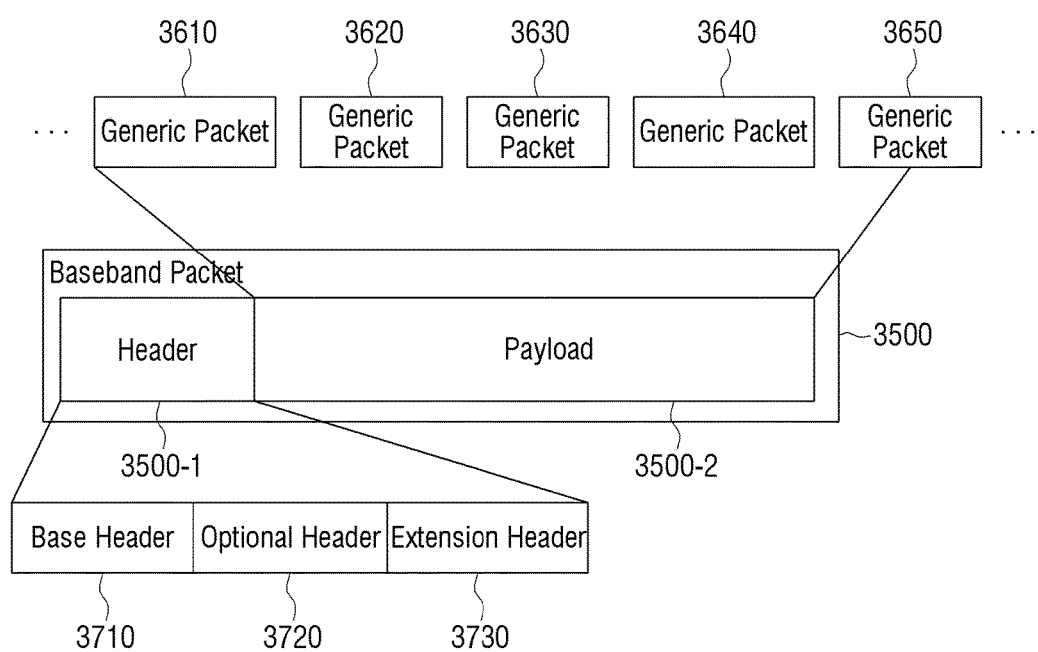

The baseband packet construction blocks 3100, 3100-1, . . . , 3100-n construct baseband packets. Each baseband packet 3500 includes a header 3500-1 and a payload 3500-2 as illustrated in FIG. 5B. A baseband packet is fixed to a length Kpayload. ALP packets 3610 to 3650 are sequentially mapped to a baseband packet 3500. When the ALP packets 3610 to 3650 do not completely fit in the baseband packet 3500, these packets are distributed between a current baseband packet and a next baseband packet. The ALP packets are distributed in a unit of a byte.

The baseband packet header construction blocks 3200, 3200-1, . . . , 3200-n construct a header 3500-1. The header 3500-1 includes three parts, that is, a base field (also referred to as, a base header) 3710, an optional field (also referred to as, an option header) 3720, and an extension field (also referred to as, an extension header) 3730, as illustrated in FIG. 5B. Herein, the base field 3710 is shown in every baseband packet and the optional field 3720 and the extension field 3730 may not be shown in every baseband packet.

A main function of the base field 3710 provides a pointer of an offset value as bytes to indicate a start of a next ALP packet in a baseband packet. When an ALP packet starts a baseband packet, the value of the pointer becomes 0. When there is no ALP packet that starts in the baseband packet, the value of the pointer may be 8191 and a base header of 2 bytes may be used.

The extension field 3730 may be used afterwards and for example, used for a baseband packet counter, baseband packet time stamping, additional signaling, and the like.

The baseband packet scrambling blocks 3300, 3300-1, . . . , 3000-n scramble the baseband packet.

Figure 6:
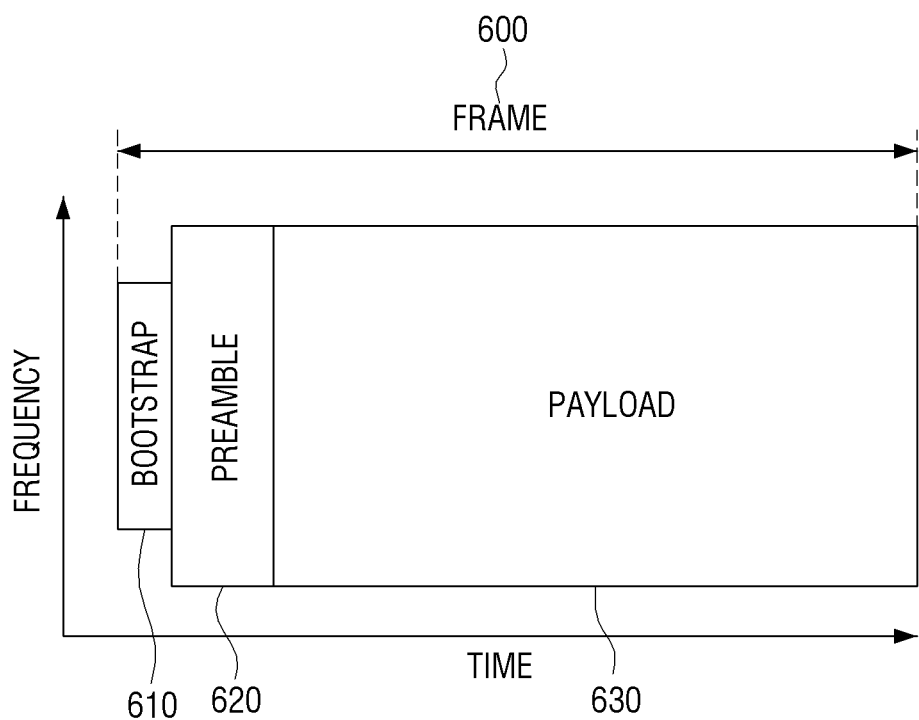
FIG. 6 is a diagram illustrating a configuration of a frame, according to an exemplary embodiment.

FIG. 6 is a diagram illustrating a configuration of a frame, according to an exemplary embodiment.

Referring to FIG. 6, the frame 600 may be represented by a combination of three basic components. In detail, the frame 600 may include a bootstrap 610 positioned in a start portion of each frame, a preamble 620 positioned behind the bootstrap 610, and a payload 630 positioned behind the preamble 620.

Here, the preamble 620 includes L1 control signaling used to process data included in the payload 630.

In addition, the payload 630 includes at least one subframe, and when a plurality of subframes are present in the payload 630, all of the plurality of subframes are disposed to be connected to each other based on a time axis illustrated in FIG. 6.

Each subframe includes a fast Fourier transform (FFT) size, a GI length, a scattered pilot pattern, and the number of carriers (NoC), and the FFT size, the GI length, the scattered pilot pattern, and the NoC are not changed in the same subframe. However, the FFT sizes, the GI lengths, the scattered pilot patterns, and the NoCs may be different from each other between different subframes in the frame 600.

Particularly, the bootstrap 610 may include a synchronization symbol positioned in a start portion of each frame in order to detect a signal, precisely perform synchronization, estimate a frequency offset, and perform initial channel estimation.

In addition, the bootstrap 610 may include control signaling required for receiving and decoding portions (the preamble 620 and the payload 630) other than the bootstrap 610 in the frame 600.

In detail, the bootstrap 610 uses a fixed sampling rate of 6.144 Ms/sec and a fixed bandwidth of 4.5 MHz, regardless of a channel bandwidth used for the portions other than the bootstrap 610.

Figure 7:
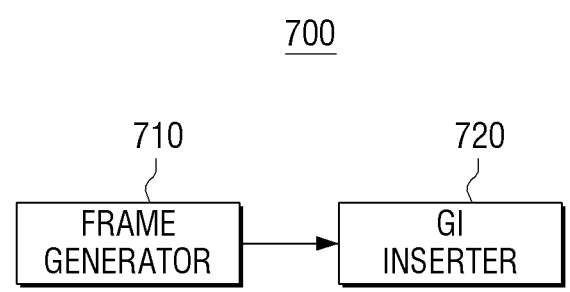
FIG. 7 is a block diagram illustrating a configuration of a transmitting apparatus according to an exemplary embodiment.

FIG. 7 is a block diagram illustrating a configuration of a transmitting apparatus according to an exemplary embodiment.

According to FIG. 7, the transmitting apparatus 700 includes a frame generator 710 and a GI inserter 720.

The frame generator 710 generates a frame including a plurality of orthogonal frequency-division multiplexing (OFDM) symbols. Here, the plurality of OFDM symbols are divided into a plurality of components including a bootstrap, a preamble, and a payload, which has been described above in FIG. 6. Therefore, a detailed description will be omitted.

In addition, the GI inserter 720 inserts a guard interval (GI) into the generated frame. Here, the GI inserter 720 is included in the waveform generation block 14000 described in FIG. 3A. In detail, a process performed in the waveform generation block 14000 will be described.

Figure 8:
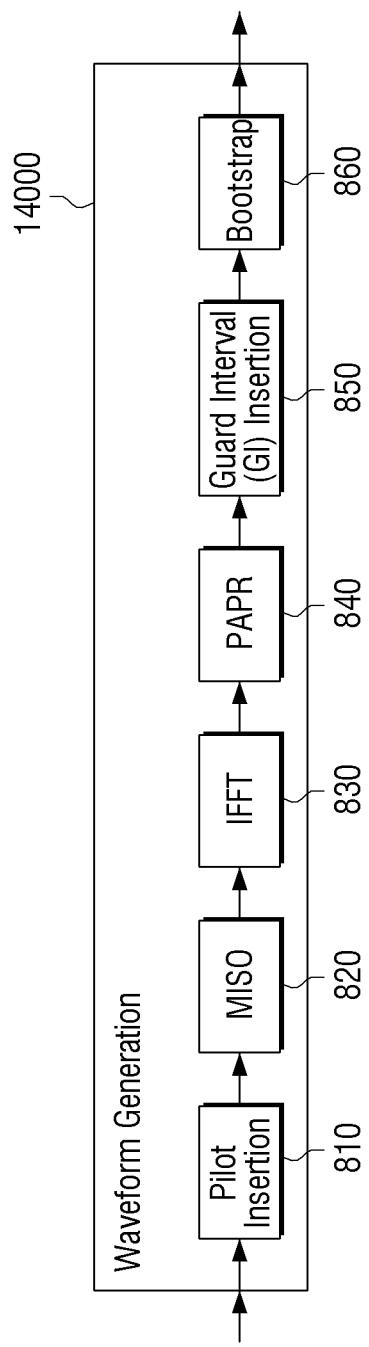
FIG. 8 is a block diagram illustrating a detailed configuration of the waveform generation block, according to an exemplary embodiment.

FIG. 8 is a block diagram illustrating a detailed configuration of the waveform generation block, according to an exemplary embodiment.

Referring to FIG. 8, the waveform generation block 14000 includes a pilot insertion 810, an MISO 820, an IFFT 830, a PAPR 840, a guard interval insertion 850, and a bootstrap 860.

The pilot insertion 810 inserts at least one of a preamble pilot, a scattered pilot, a subframe boundary pilot, a continual pilot, and an edge pilot into the frame generated in the frame generator 710.

In addition, the MISO 820 applies a transmit diversity code filter to the frame to perform MISO pre-distortion, and the IFFT 830 performs inverse-Fast Fourier transform (IFFT) on the frame to allow each OFDM symbol to be divided into a useful region and a guard interval.

In addition, the PAPR 840 may perform correction of the OFDM signal, tone reservation, active constellation, and the like, in order to decrease a peak to average power ratio of the output OFDM signal.

Then, the guard interval insertion 850 may insert the guard intervals into the frame, and patterns of the guard intervals that may be inserted depending on the FFT size of the OFDM symbol may be defined as represented by the following Table 1.

TABLE 1

| GI Pattern | Duration in Samples | 8K FFT | 16K FFT | 32K FFT |
| --- | --- | --- | --- | --- |
| GI1_192 | 192 | ✓ | ✓ | ✓ |
| GI2_384 | 384 | ✓ | ✓ | ✓ |
| GI3_512 | 512 | ✓ | ✓ | ✓ |
| GI4_768 | 768 | ✓ | ✓ | ✓ |
| GI5_1024 | 1024 | ✓ | ✓ | ✓ |
| GI6_1536 | 1536 | ✓ | ✓ | ✓ |
| GI7_2048 | 2048 | ✓ | ✓ | ✓ |
| GI8_2432 | 2432 |  | ✓ | ✓ |
| GI9_3072 | 3072 |  | ✓ | ✓ |
| GI10_3648 | 3648 |  | ✓ | ✓ |
| GI11_4096 | 4096 |  | ✓ | ✓ |
| GI12_4864 | 4864 |  |  | ✓ |

The above-mentioned guard interval insertion 850 may correspond to the GI inserter 720 according to an exemplary embodiment. In addition, a process of inserting first GIs having a size corresponding to the FFT size of each of the OFDM symbols by a GI inserter 720 to be described below may be performed based on the above Table 1.

The bootstrap 860 inserts the generated bootstrap into the frame.

Again, referring to FIG. 7, the GI inserter 720 inserts first GIs having a size corresponding to a fast Fourier transform (FFT) size of each of OFDM symbols configuring the payload into front ends of each of the OFDM symbols, inserts second GIs having a size corresponding to a quotient obtained by dividing an extra region of the payload calculated based on the FFT size of the OFDM symbols configuring the payload, the number of OFDM symbols, and the size of the first GIs by the number of OFDM symbols into front ends of each of the first GIs, and inserts a cyclic postfix (CP) having a size corresponding to the remainder remaining after dividing the extra region of the payload by the number of OFDM symbols into a rear end of a final OFDM symbol configuring the payload.

In detail, the payload includes N OFDM symbols. Here, since a length of the frame is fixed and the FFT size of the OFDM symbol is also fixed, the payload may include a region remaining after it includes all of the N OFDM symbols. Here, the region remaining after the payload includes all of the N OFDM symbols is defined as an extra region.

In detail, the extra region may be calculated through the following Equation 1 and Equation 2:

$$N_{extra} = (T_{frame} - T_{Bootstrap}) \times BSR - \\ N_{symbols}^{preamble} \times (N_{FFT}^{preamble} + N_{GI}^{preamble}) - \\ \sum_{k=1}^{N_{sub}} N_{symbols}^{k} \times (N_{FFT}^{k} + N_{GI}^{k})$$ [Equation 1]

-continued $$N_{symbols} = \sum_{k=1}^{N_{sub}} N_{symbols}^k. \quad \text{[Equation 2]}$$

Here, $T_{bootstrap}$ means an entire time length of the bootstrap included in the frame. In addition, $T_{frame}$ means an entire time length of the frame. BSR means a baseband sampling rate for a region except the bootstrap in the frame. $N_{symbols}^{preamble}$ means the number of preamble symbols. $N_{FFT}^{preamble}$ means an FFT size of a preamble symbol. $N_{GI}^{preamble}$ means a guard interval length for the preamble symbol.

Nsub means the number of subframes included in the frame.

$N_{symbols}^k$ means the number of OFDM symbols included in a k-th subframe.

$N_{FFT}^k$ means an FFT size of the k-th subframe.

$N_G^k$ means a guard interval length for the k-th subframe.

$N_{extra}$ means the total number of extra samples included in the extra region, and is defined to be the same as a size of the extra region in the present disclosure.

Therefore, referring to the above Equation 1, it may be appreciated that the extra region according to an exemplary embodiment is calculated when a length corresponding to the bootstrap is subtracted from the entire length of the frame, a length corresponding to the preamble symbol is subtracted in consideration of the FFT size and the GI of the preamble symbol, and a length corresponding to all the subframes is subtracted in consideration of the FFT size and the GI of each of the subframes.

In addition, the above Equation 2 means the total number of OFDM symbols except the preamble in the frame.

Figure 9:
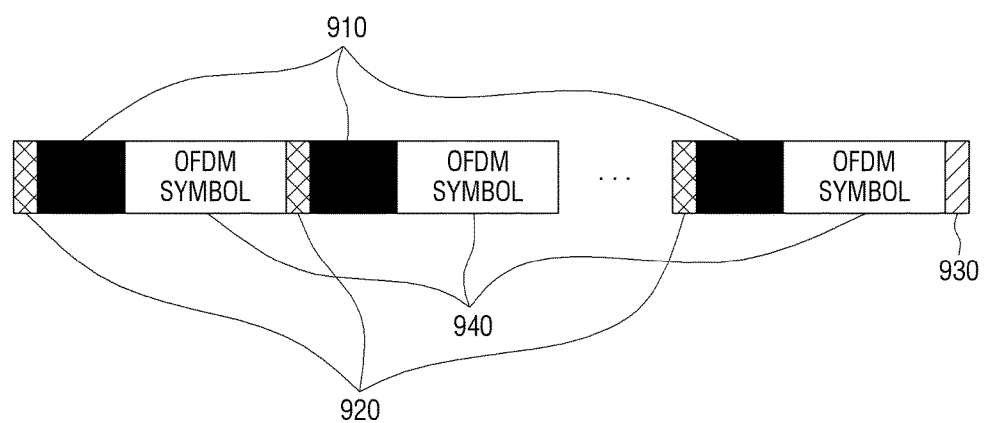
FIG. 9 is a diagram illustrating a process of inserting first GIs and second GIs into the frame, according to an exemplary embodiment.

FIG. 9 is a diagram illustrating a process of inserting first GIs and second GIs into the frame, according to an exemplary embodiment.

Referring to FIG. 9, the GI inserter 720 may insert first GIs 910 having a size corresponding to an FFT size of each of OFDM symbols 940 configuring the payload into front ends of each of the OFDM symbols. Here, the size of the first GI 910 may be determined depending on a size of the GI corresponding to the FFT size of each of the OFDM symbols defined in the above Table 1.

In addition, the GI inserter 720 may calculate the extra region of the payload based on the FFT size of the OFDM symbols 940 configuring the payload, the number of OFDM symbols 940, and the number of first GIs 910. Here, the GI inserter 720 may calculate the extra region of the payload through the above Equations 1 and 2, the FFT size of the OFDM symbols 940 corresponds to $N_{FFT}^k$, the number of OFDM symbols 940 corresponds to $N_{symbols}^k$, and the number of first GIs 940 corresponds to $N_G^k$.

In addition, the GI inserter 720 inserts second GIs 920 having a size corresponding to a quotient obtained by dividing the calculated extra region by the number of OFDM symbols into front ends of each of the first GIs 910, and inserts a cyclic postfix (CP) 930 having a size corresponding to the remainder remaining after dividing the calculated extra region by the number of OFDM symbols into a rear end of a final OFDM symbol configuring the payload.

For example, when it is assumed that a size of the calculated extra region is 11 and the number of OFDM symbols 940 configuring the payload is 2, the GI inserter 720 may insert second GIs 920 having a size corresponding to a quotient obtained by dividing 11 by 2, that is, 5 into front ends of each of the first GIs 910, and may insert a CP 930 having a size corresponding to the remainder remaining after dividing 11 by 2, that is, 1 to a rear end of a final OFDM symbol configuring the payload.

The CP includes portions of the final OFDM symbol configuring the payload. In addition, the first and second GIs may include portions of each of the OFDM symbols. It will be described in detail through FIG. 10.

Figure 10:
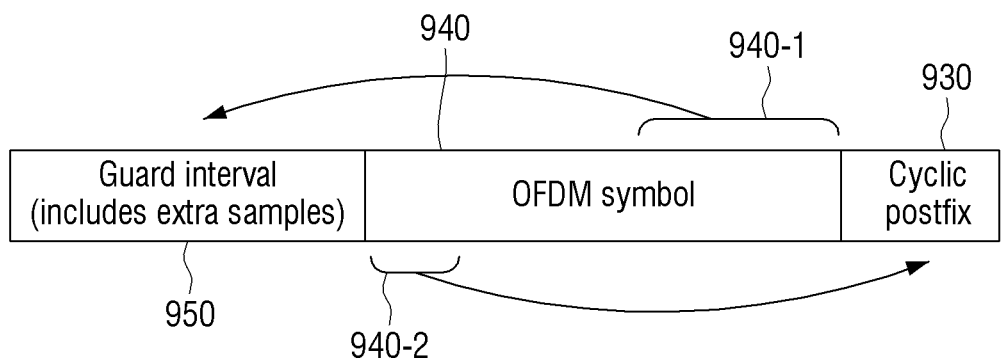
FIG. 10 is a diagram illustrating configurations of the first GI, the second GI, and the CP in detail, according to an exemplary embodiment.

FIG. 10 is a diagram illustrating configurations of the first GI, the second GI, and the CP in detail, according to an exemplary embodiment.

Referring to FIG. 10, the CP 930 includes samples 940-2 from a start point of the final OFDM symbol to a point corresponding to a size of the remainder remaining after the calculated extra region is divided by the number of OFDM symbols, among a plurality of samples configuring the final OFDM symbol 940.

For example, when it is assumed that the calculated extra region is 11 and the number of OFDM symbols is 2, the CP 930 includes samples from a start point of the final OFDM symbol to a point corresponding to a size of 1 remaining after 11 is divided by 2, among the plurality of samples configuring the final OFDM symbol 940.

In addition, the first and second GIs are illustrated as a guard interval (including extra samples) 950 in FIG. 10, and the guard interval 950 illustrated in FIG. 10 includes the first and second GIs. The extra samples illustrated in FIG. 10 mean the second GIs.

Here, the first and second GIs, that is, the guard interval 950 includes samples 940-1 from a final point of the OFDM symbol 940 to a point corresponding to the sum of a size corresponding to the FFT size of the OFDM symbol 940 and a size of the quotient, among the plurality of samples configuring the OFDM symbol 940.

For example, when it is assumed that the calculated extra region is 11 and the number of OFDM symbols is 2, the guard interval 950 includes samples from a final point of the OFDM symbol 940 to a point corresponding to the sum of a size (that is, a size of the first GI) corresponding to the FFT size of the OFDM symbol 940 and corresponding to 5, which is a quotient obtained by dividing 11 by 2, among the plurality of samples configuring the OFDM symbol 940.

The GI inserter 720 may insert the calculated extra region into the frame by various methods, which will be described.

FIGS. 11 to 16 are diagrams illustrating various methods of distributing and inserting the calculated extra region, according to an exemplary embodiment.

[In the Case in which OFDM Symbols Having the Same FFT Size are Included in the Frame]

Figure 11:
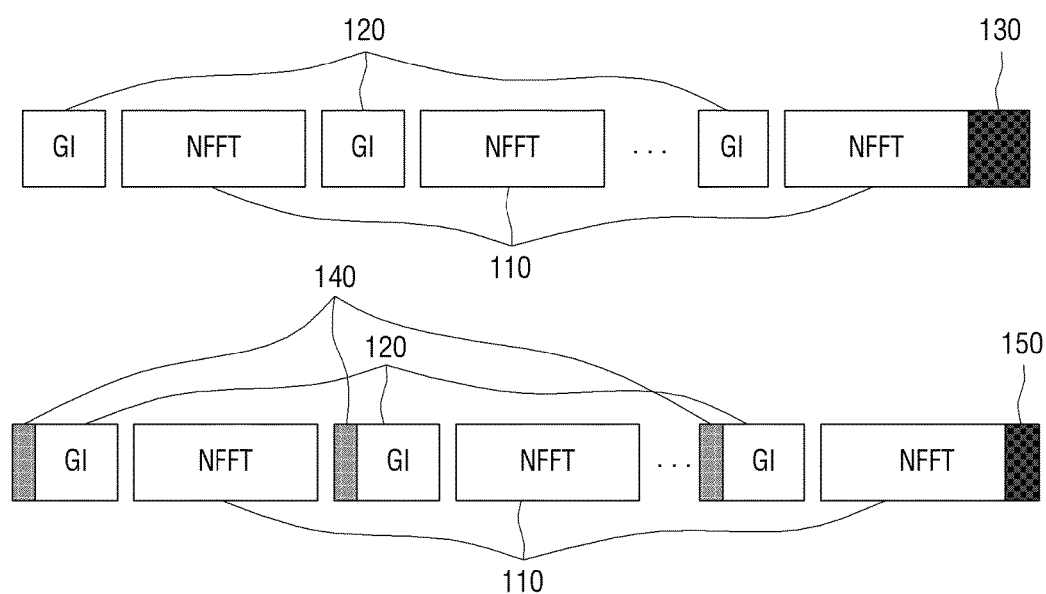
FIGS. 11 to 16 are diagrams illustrating various methods of distributing and inserting the calculated extra region, according to an exemplary embodiment.

Referring to FIG. 11, all of a plurality of OFDM symbols 110 included in the frame have the same FFT size, and first GIs 120 are inserted into front ends of each of the OFDM symbols. Here, the first GI 120 is denoted by GI.

In addition, the GI inserter 720 may calculate an extra region 130 based on the above Equations 1 and 2 in consideration of an FFT size of the OFDM symbols 110, a length of the first GIs 120, and the number of OFDM symbols 110.

In addition, the GI inserter 720 inserts second GIs 140 having a size corresponding to a quotient obtained by dividing the extra region 130 by the number of OFDM symbols 110 in the calculated extra region 130 into front ends of each of the first GIs 120, and inserts the remainder region 150 remaining in the calculated extra region 130, that is, a region 150 corresponding to a size corresponding to the remainder remaining after dividing the extra region 130 by the number of OFDM symbols 110 into a rear end of a final OFDM symbol.

Here, the remainder region 150 inserted into the rear end of the final OFDM symbol may be used to perform channel estimation of the following frame.

In addition, the GI inserter 720 may also apply different disposition references depending on a size of the remainder region 150 inserted into the rear end of the final OFDM symbol.

In detail, when the size of the remainder region 150 is smaller than or equal to a preset reference, for example, ½ or ⅔ of the number of OFDM symbols, the GI inserter 720 may insert the remainder region 150 into the rear end of the final OFDM symbol, as illustrated in FIG. 11, and when the size of the remainder region 150 is equal to or larger than the preset reference, for example, ½ or ⅔ of the number of OFDM symbols, the GI inserter 720 may sequentially insert regions having sizes obtained by dividing the remainder region 150 by the number of the plurality of OFDM symbols with respect to the plurality of OFDM symbols included in the payload.

Figure 12:
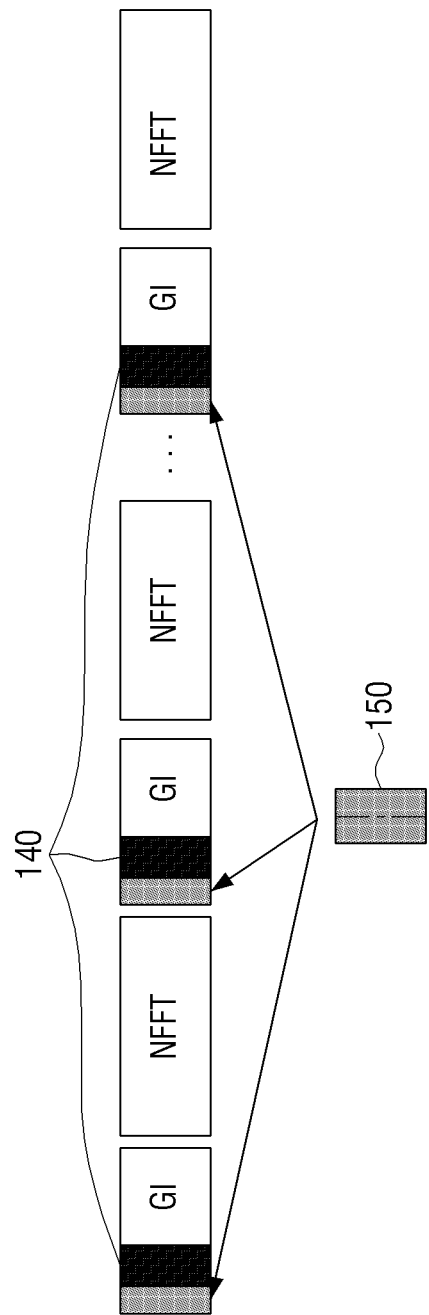

Referring to FIG. 12, when the size of the remainder region 150 is the preset reference, for example, ½ or ⅔ of the number of OFDM symbols, the GI inserter 720 may insert the remainder region 150 into front ends of the second GIs 140 inserted into front ends of each of the plurality of OFDM symbols included in the payload.

For example, when the number of the plurality of OFDM symbols included in the payload is 2, the GI inserter 720 may insert halves of the remaining region divided by the total number of symbols into the front ends of the second GIs 140 inserted into the front ends of the plurality of OFDM symbols.

Figure 13:
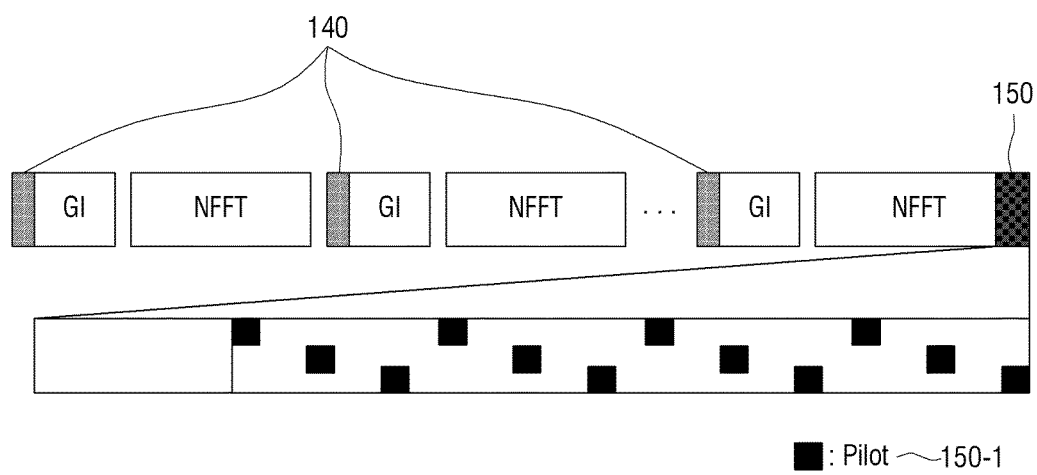

In addition, referring to FIG. 13, the remainder region 150 inserted into the rear end of the final OFDM symbol described in FIG. 11 may include information including a pilot pattern into which a pilot 150-1 is inserted so that it may be used to perform channel estimation of the following frame.

[In the Case in which OFDM Symbols Having Two or More FFT Sizes are Included in the Frame]

In the case in which OFDM symbols having two or more FFT sizes are present in the frame, an example in which an extra region is inserted will be described.

Figure 14:
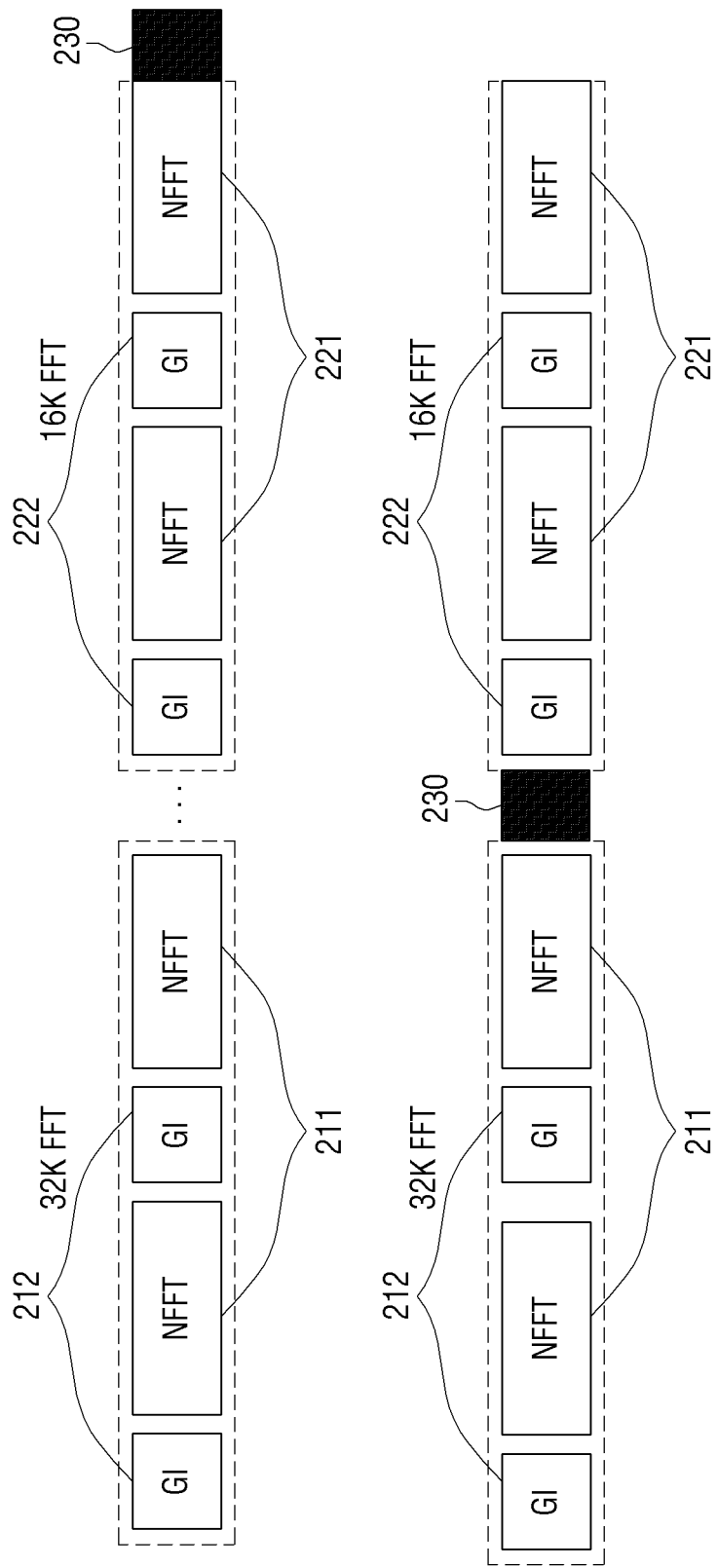

Referring to FIG. 14, one or more OFDM symbols 211 having a 32K FFT size and one or more OFDM symbols 221 having a 16K FFT size are included in one frame, first GIs 212 corresponding to the 32K FFT size are inserted into front ends of each of the OFDM symbol 211 having the 32K FFT size, and first GIs 222 corresponding to the 16K FFT size are inserted into front ends of each of the OFDM symbol 221 having the 16K FFT size. In addition, an extra region 230 is present.

Here, the GI inserter 720 does not insert regions having sizes corresponding to the quotient and the remainder obtained by dividing the extra region 230 by the number of the plurality of OFDM symbols into the front ends of each of the OFDM symbols and the rear end of the final OFDM symbol, respectively, as described in FIG. 11, but inserts the extra region 230 in a boundary portion between the OFDM symbol 211 having the 32K FFT size and the OFDM symbol 221 having the 16K FFT size to allow the extra region 230 to function as a reference signal used for synchronization and channel estimation.

In addition, even in the case in which the OFDM symbols having the two or more FFT sizes are present in one frame, the GI inserter 720 may also divide and insert the extra region by the method as described in FIG. 11.

Figure 15:
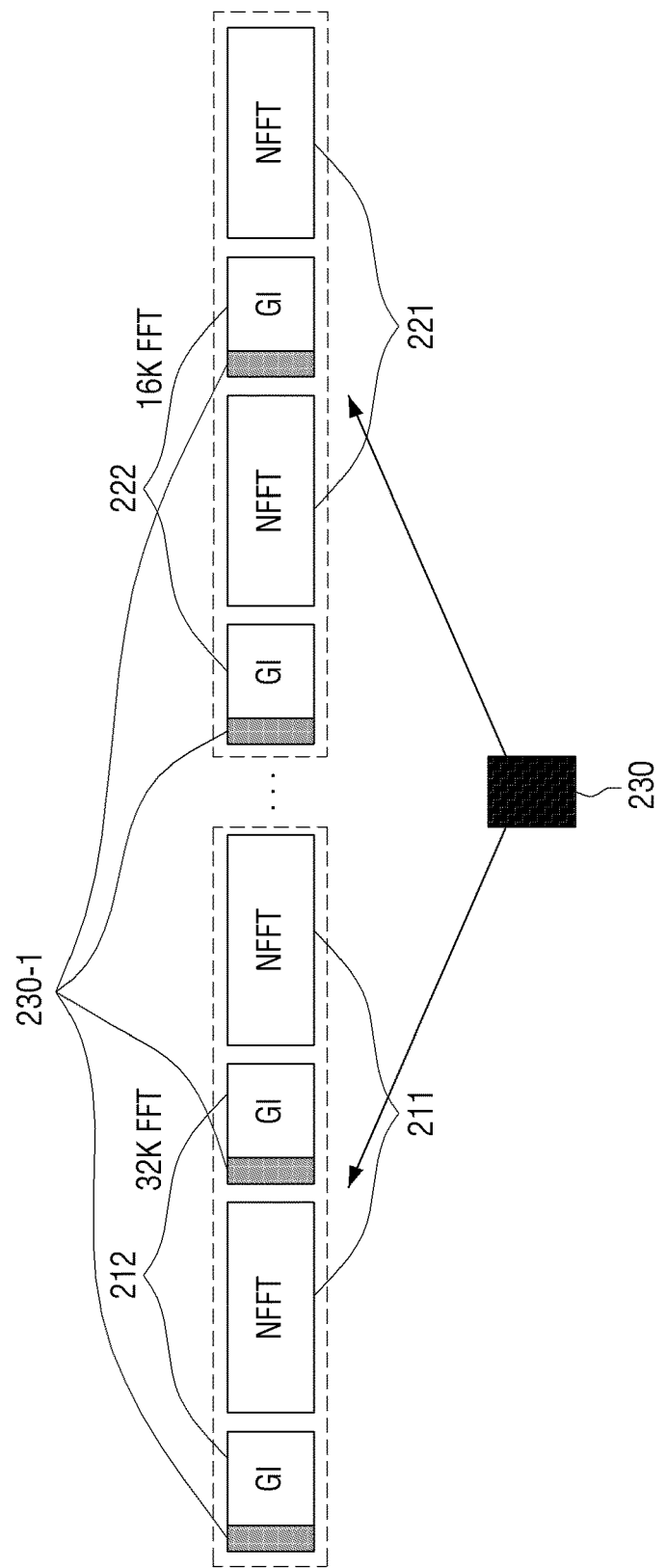

Referring to FIG. 15, one or more OFDM symbols 211 having a 32K FFT size and one or more OFDM symbols 221 having a 16K FFT size are included in one frame, first GIs 212 corresponding to the 32K FFT size are inserted into front ends of each of the OFDM symbol 211 having the 32K FFT size, and first GIs 222 corresponding to the 16K FFT size are inserted into front ends of each of the OFDM symbol 221 having the 16K FFT size.

In addition, the GI inserter 720 may insert second GIs 230-1 having a size corresponding to a quotient obtained by dividing the extra region 230 by the total number of OFDM symbols without considering the FFT sizes into front ends of each of the first GIs 212 and 222. In addition, the GI inserter 720 may insert a CP having a size corresponding to the remainder remaining after dividing the extra region 230 by the total number of OFDM symbols without considering the FFT sizes into a rear end of the final OFDM symbol of the payload.

Figure 16:
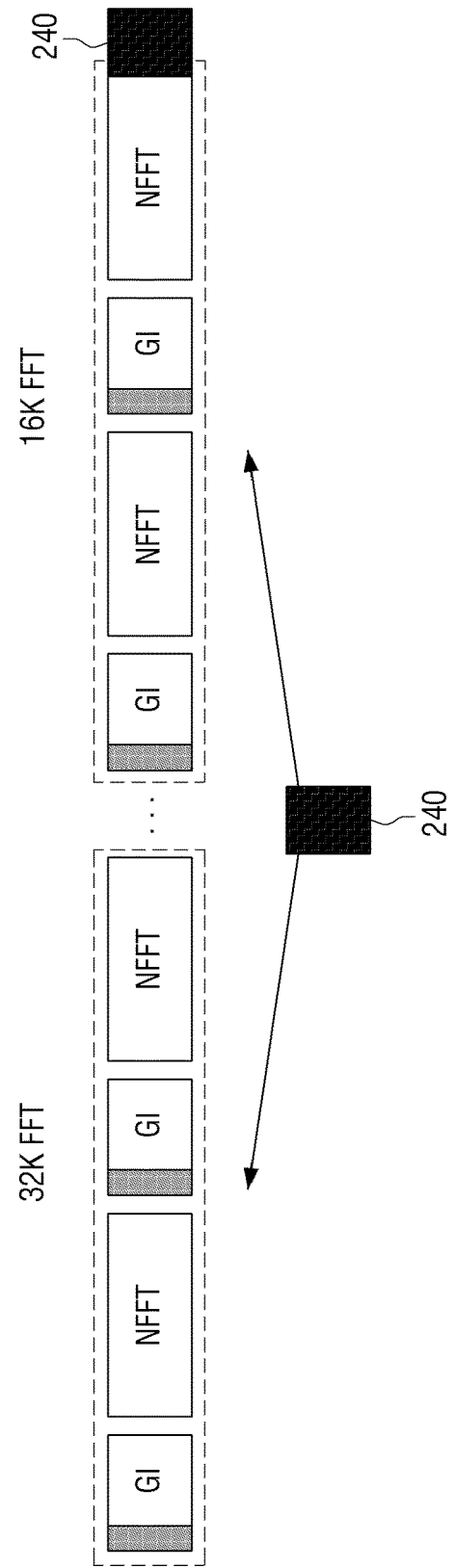

Alternatively, referring to FIG. 16, the GI inserter 720 may insert a CP 240 having a size corresponding to the remainder remaining after dividing the extra region 230 by the total number of OFDM symbols without considering the FFT sizes into the rear end of the final OFDM symbol when the size of the CP 240 is a preset reference, for example, ½ or ⅔ of the number of OFDM symbols, and sequentially insert regions having sizes obtained by dividing the extra region 230 by the number of the plurality of OFDM symbols with respect to the plurality of OFDM symbols included in the payload when the size of the CP 240 is equal to or larger than the preset reference, for example, ½ or ⅔ of the number of OFDM symbols.

In addition, the GI inserter 720 may also distribute and insert the CP 240 having a size corresponding to the remainder in consideration of a ratio between the FFT sizes of the OFDM symbols included in the frame in FIGS. 14 to 16.

For example, in the case in which the number of the plurality of OFDM symbols included in the payload is 2, the GI inserter 720 does not insert halves of the entire size of the remainder CP obtained by dividing the total number of symbols of the CP 240 having a size corresponding to the remainder by 2, which is the number of the plurality of OFDM symbols into front ends of the second GIs 230-1 inserted into the front ends of each of the plurality of OFDM symbols, but may divide the entire size of the CP 240 having the size corresponding to the remainder in a ratio of 2:1 and insert regions having sizes divided in the ratio of 2:1 into the front ends of the second GIs 230-1 inserted into the front ends of each of the plurality of OFDM symbols in the case in which the FFT sizes are 32K and 16K, respectively.

The GI inserter 720 may generate information on whether the extra region of the payload is distributed and a disposition reference of the extra region. In addition, the transmitting apparatus 700 according to an exemplary embodiment may further include a transmitter (not illustrated) transmitting the frame including the information on whether the extra region of the payload is distributed and the disposition reference of the extra region. In detail, the transmitter (not illustrated) may transmit the information on whether the extra region of the payload is distributed and the disposition reference of the extra region as L1 signaling.

Figure 17:
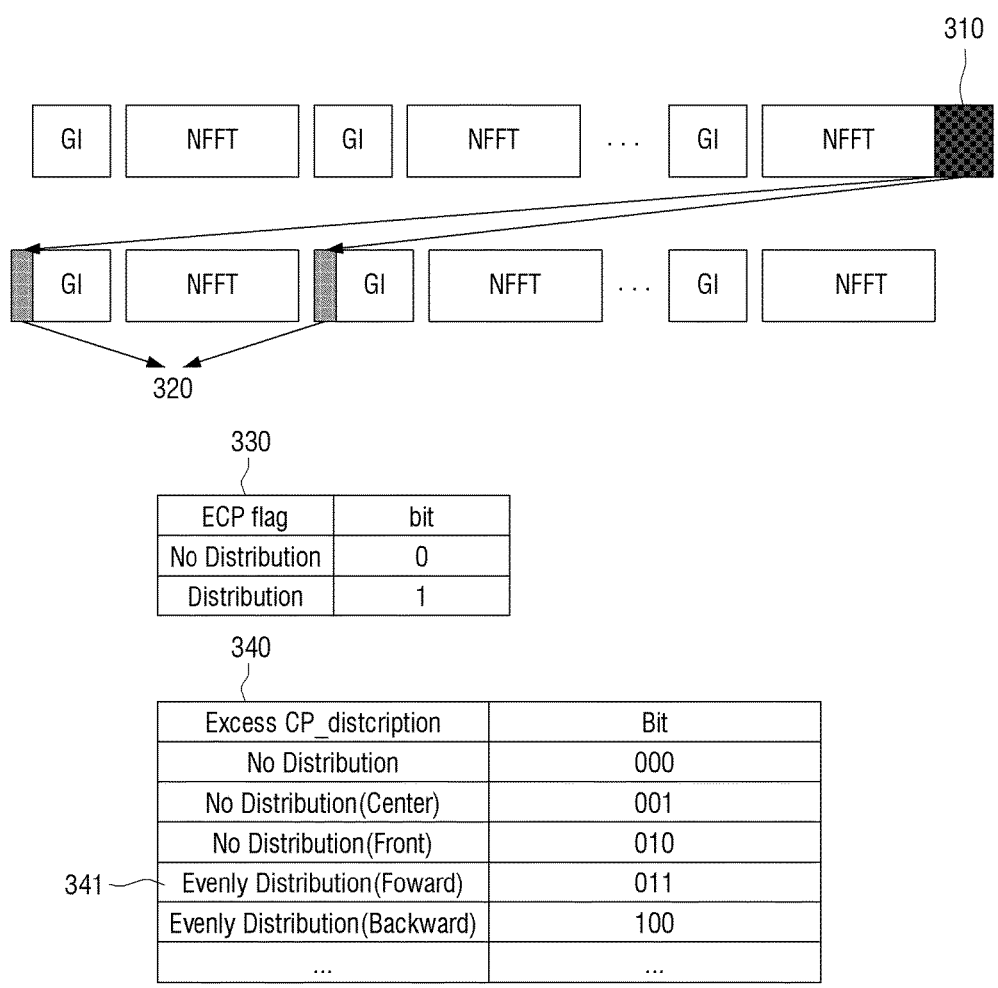
FIGS. 17 to 19 are diagrams illustrating information on whether the extra region of the payload is distributed and a disposition reference of the extra region, according to an exemplary embodiment.
Figure 18:
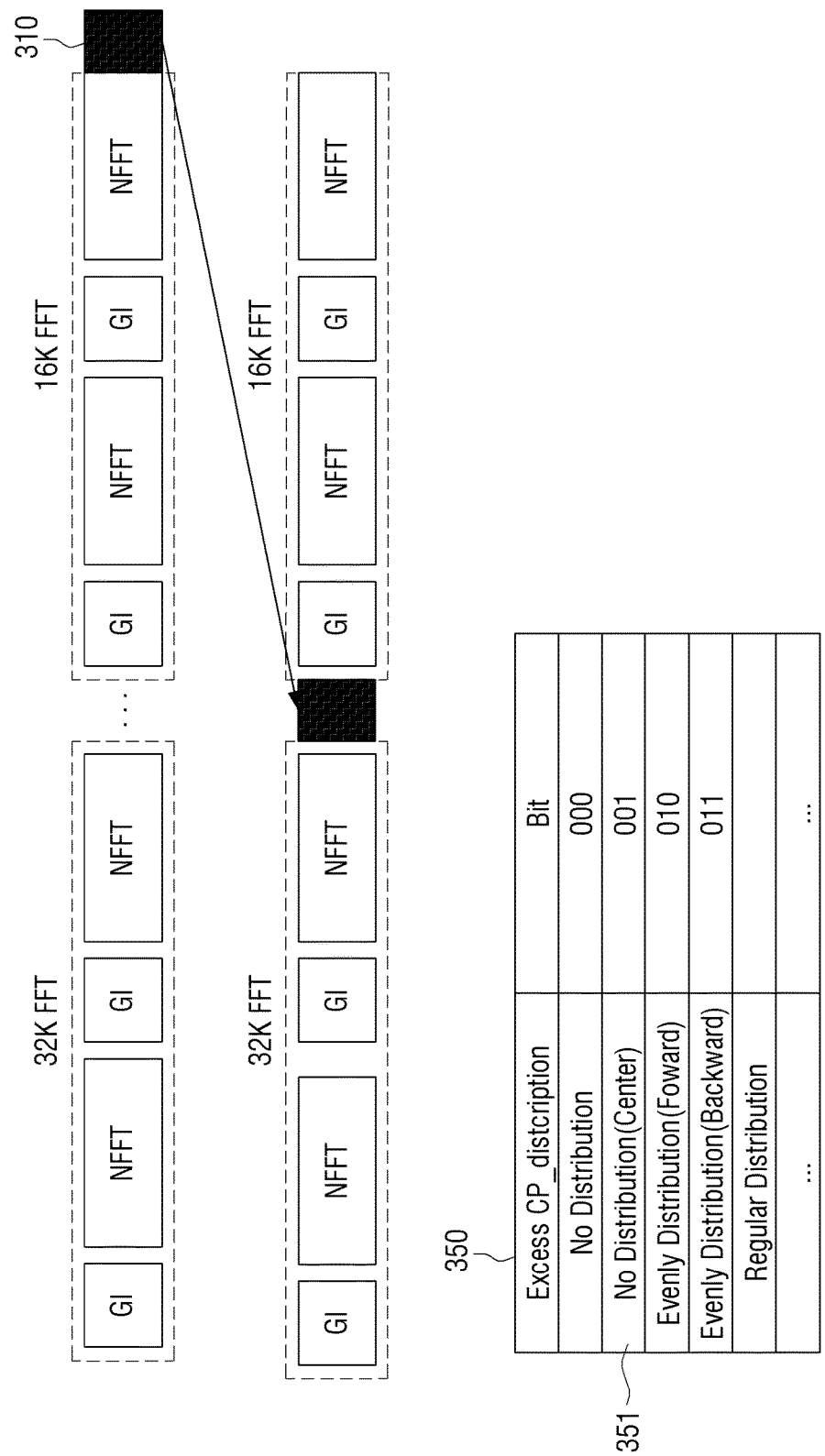
Figure 19:
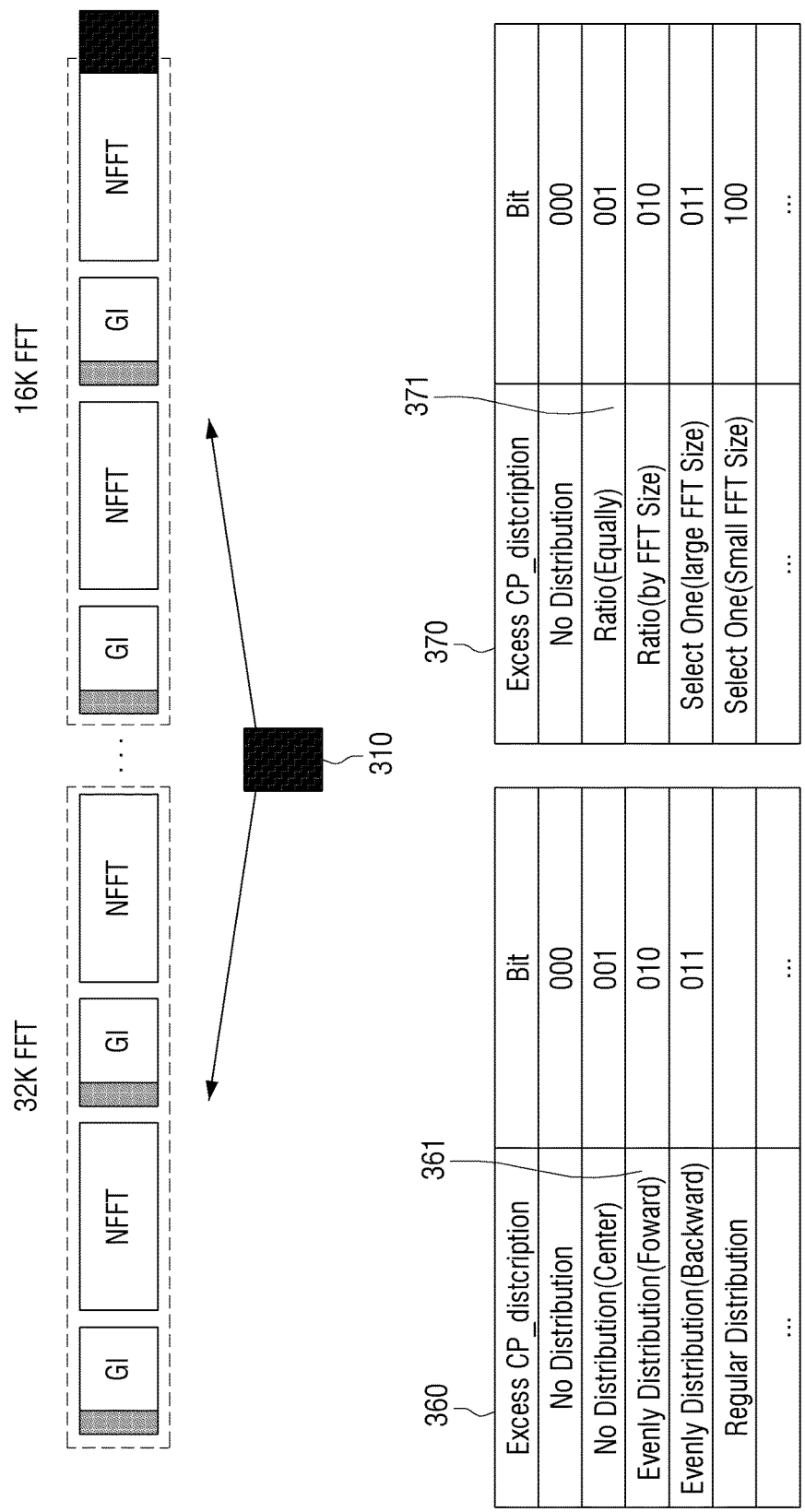

FIGS. 17 to 19 are diagrams illustrating information on whether the extra region of the payload is distributed and a disposition reference of the extra region, according to an exemplary embodiment.

Referring to FIG. 17, in the case in which an extra region 310 is evenly distributed and inserted (320) into front ends of first GIs inserted into front ends of each of the OFDM symbols (in the case in which the extra region is inserted by the same method as the method described in FIG. 11), the GI inserter 720 may generate information on whether the extra region 310 is distributed in a form of an ECP flag 330.

For example, the ECP flag 330 has a value of "0" in the case in which the extra region 310 is not distributed, and has a value of "1" in the case in which the extra region 310 is distributed.

In addition, the GI inserter 720 may generate information 340 on a disposition reference of the extra region 310. The information 340 on the disposition reference may include information on a method in which the extra region 310 is divided and disposed, and information on a disposition position of the extra region 310. For example, information on whether the extra region 310 is evenly divided and is inserted into front ends of each of the OFDM symbols or inserted into rear ends of each of the OFDM symbols, information on which the extra region 310 is differently divided depending on a ratio between the FFT sizes and is inserted into front ends of each of the OFDM symbols or inserted into rear ends of each of the OFDM symbols, information on which the extra region 310 is inserted into a boundary region between the OFDM symbols having different FFT sizes, or the like, may be included in the information 340 on the disposition reference. In addition, the information on the preset reference described above (for example, the information on whether the remainder region 150 is smaller than and equal to or equal to and larger than ½ or ⅔ of the number of OFDM symbols) may also be included in the information 340 on the disposition reference.

In FIG. 17, the extra region 310 is evenly divided and inserted into the front ends of each of the OFDM symbols, which corresponds to "Evenly distribution(Forward)" 341. Therefore, the information 340 on the disposition reference may store a value of "011".

Referring to FIG. 18, the extra region 310 is inserted into a boundary between the OFDM symbol having the 32K FFT size and the OFDM symbol having the 16K FFT size without being distributed, which corresponds to "No Distribution(Center)" 351. Therefore, the information 350 on the disposition reference may store a value of "001".

In addition, referring to FIG. 19, the extra region 310 is evenly divided and inserted into the front ends of each of the OFDM symbols, which corresponds to "Evenly Distribution (Forward)" 361. Therefore, the information 360 on the disposition reference may store a value of "010".

In addition, the information 360 on the disposition reference may include information 370 on a disposition ratio. In the case of FIG. 19, the extra region 310 is evenly divided and inserted into the front ends of each of the OFDM symbols, which corresponds to "Ratio(Equally)". Therefore, the information 370 on the disposition ratio may store a value of "001".

Figure 20:
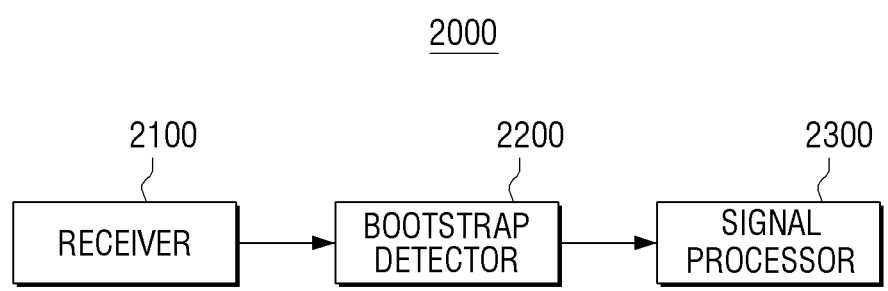
FIG. 20 is a block diagram illustrating a configuration of a receiving apparatus according to an exemplary embodiment.

FIG. 20 is a block diagram illustrating a configuration of a receiving apparatus according to an exemplary embodiment.

The receiving apparatus 2000 includes a receiver 2100, a bootstrap detector 2200, and a signal processor 2300.

The receiving apparatus 2000 may be implemented to receive data from the transmitting apparatus mapping and transmitting data included in an input stream on at least one signal processing path.

The receiver 2100 receives a stream including the frame including the bootstrap, the preamble, and the payload. In detail, the receiver 2100 may receive signaling information and the stream including the data mapped on at least one signal processing path. Here, the signaling information may include information about an input type of the input stream input to the receiving apparatus and information about a data type mapped on at least one signal processing path. Here, the information about the input type of the input stream may represent whether all of the signal processing paths in the frame are the same input type.

The signaling information may be a layer 1 (L1) signaling signal transmitting an L1 signal for frame synchronization, and a preamble into which the L1 signaling information is inserted may include an L1 pre signaling area and an L1 post signaling area. Further, the L1 post signaling area includes a configurable field and a dynamic field.

The L1 pre signaling area may include information for analyzing the L1 post signaling and information about the entire system, and the L1 pre signaling area may be implemented to have the same length at all times. Further, the L1 post signaling area may include information about the respective PLP and information about the system, and in one superframe, the L1 signaling areas included in respective frames have the same length, but contents included in the L1 signaling areas may vary.

In addition, the bootstrap detector 2200 detects the bootstrap in the frame. In detail, the bootstrap detector 2200 may detect the bootstrap based on a correlation between an input signal and a pre-stored reference signal. In detail, the bootstrap detector 2200 may decide whether the input signal and the pre-stored reference signal coincide with each other to detect the correlation between the input signal and the pre-stored reference signal. In addition, the bootstrap detector 2200 may detect the bootstrap by measuring a start point of the bootstrap based on the detected correlation.

In addition, the signal processor 2300 signal-processes the preamble based on the detected bootstrap, and signal-processes the payload based on the signal-processed preamble.

Here, first GIs having a size corresponding to an FFT size of each of OFDM symbols configuring the payload may be inserted into front ends of each of the OFDM symbols, second GIs having a size corresponding to a quotient obtained by dividing an extra region of the payload calculated based on the FFT size of the OFDM symbols configuring the payload, the number of OFDM symbols, and the size of the first GIs by the number of OFDM symbols may be inserted into front ends of each of the first GIs, and a cyclic postfix (CP) having a size corresponding to the remainder remaining after dividing the extra region of the payload by the number of OFDM symbols may be inserted into a rear end of a final OFDM symbol configuring the payload.

In addition, the signal processor 2300 may signal-process the payload based on information on whether the extra region of the payload is distributed and a disposition reference of the extra region, included in the bootstrap and the preamble. Here, the information whether the extra region of the payload is distributed and the disposition reference of the extra region may be included as L1 signaling in the bootstrap and the preamble.

In detail, the signal processor 2300 may effectively remove ISI based on the first GIs and the second GIs inserted into each of the OFDM symbols. In addition, the signal processor 2300 may perform channel estimation based on the remainder region remaining after distributing the extra region disposed at the end of the frame.

In addition, in the case in which OFDM symbols having different FFT sizes are present in one frame, the signal processor 2300 performs channel estimation based on an extra region disposed in a boundary between the OFDM symbols having the different FFT sizes, thereby making it possible to solve a channel estimation problem occurring when moving to regions having different FFT sizes.

Figure 21:
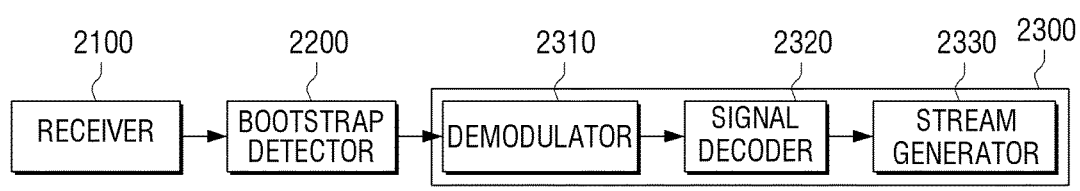
FIG. 21 is a block diagram provided to explain in detail a signal processor according to an exemplary embodiment.

FIG. 21 is a block diagram provided to explain in detail a signal processor according to an exemplary embodiment.

Referring to FIG. 21, the signal processor 2300 includes a demodulator 2310, a decoder 2320 and a stream generator 2330.

The demodulator 2310 performs demodulation according to OFDM parameters from the received RF signals, performs sync-detection, and recognizes whether a currently received frame includes necessary service data when the sync is detected from signaling information stored in a sync area. For example, the demodulator 2310 may recognize whether a mobile frame is received or a fixed frame is received.

In this case, if OFDM parameters are not previously determined regarding a signaling area and a data area, the demodulator 2310 may perform demodulation by obtaining OFDM parameters regarding the signaling area and the data area stored in the sync area, and obtaining information about OFDM parameters regarding the signaling area and the data area which are disposed right after the sync area.

The decoder 2320 performs decoding of necessary data. In this case, the decoder 2320 may perform decoding by obtaining parameters of an FEC method and a modulating method regarding the data stored in each data area based on the signaling information. Further, the decoder 2320 may calculate positions of necessary data based on the data information included in a configurable field and a dynamic field. Thus, it may calculate which positions of the frame a requested PLP is transmitted.

The stream generator 2330 may generate data to be served by processing a baseband packet input from the decoder 2320.

For example, the stream generator 2330 may generate an ALP packet from the baseband packet in which errors are corrected based on an ISSY mode, buffer size (BUFS), time to output (TTO) values and input stream clock reference (ISCR) values.

Specifically, the stream generator 2330 may include de-jitter buffers. The de-jitter buffers may regenerate correct timing to restore an output stream based on the ISSY mode, BUFS, TTO values and ISCR values. Thereby, a delay for sync between a plurality of PLPs can be compensated.

The detailed components (the demodulator 2310, the decoder 2320, and the stream generator 2330) included in the signal processor 2300 described above may signal-process the preamble based on the detected bootstrap, and signal-process the payload based on the signal-processed preamble.

In addition, the detailed components (the demodulator 2310, the decoder 2320, and the stream generator 2330) included in the signal processor 2300 may effectively remove the ISI based on the first GIs and the second GIs inserted into the payload, and perform the channel estimation based on the CP inserted into the rear end of the final OFDM symbol.

Figure 22:
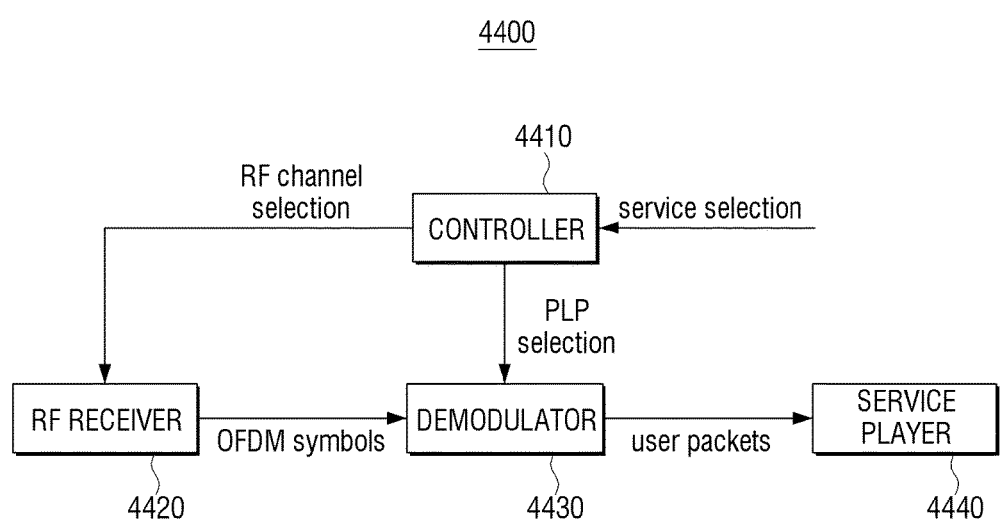
FIG. 22 is a block diagram of a receiving apparatus according to an exemplary embodiment.

FIG. 22 is a block diagram of a receiving apparatus according to an exemplary embodiment.

Referring to FIG. 22, the receiving apparatus 4400 may include a controller 4410, an RF receiver 4420, a demodulator 4430, and a service player 4440.

The controller 4410 determines an RF channel and a PLP in which a selected service is transmitted. At this process, the RF channel may be defined by a center frequency and a bandwidth, and the PLP may be defined by a PLP identifier (ID). Certain services may be transmitted through more than one PLP belonging to more than one RF channel per component constituting services. However, it is assumed in the following descriptions that all data required for playing one service are transmitted through one PLP with one RF channel for convenient explanation. Thus, services are provided with a unique data obtaining path to play services, and the data obtaining path is specified by an RF channel and a PLP.

The RF receiver 4420 extracts RF signals from a selected RF channel by the controller 4410, and delivers OFDM symbols, extracted by performing signal-processing of the RF signals, to the demodulator 4430. The signal processing may include synchronization, channel estimation and equalization. Information required for the signal processing is predetermined between a transmitting apparatus and the receiving apparatuses or transmitted to the receiving apparatus in a predetermined OFDM symbols among the OFDM symbols.

The demodulator 4430 extracts a user packet by performing signal processing of the OFDM symbols, and delivers to the service player 4440. The service player 4440 plays and outputs the service selected by a user with the user packet. A format of the user packet may be different according to implementing services. For example, a TS packet or an IPv4 packet may be the user packet.

Figure 23:
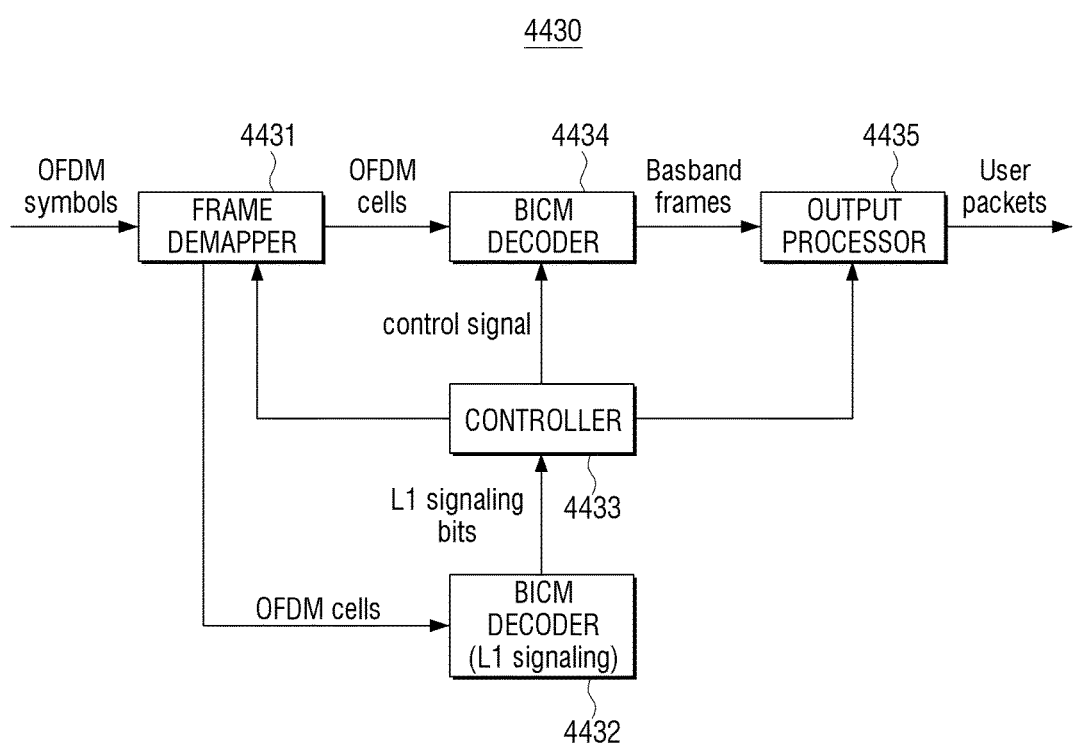
FIG. 23 is a block diagram describing the demodulator of FIG. 21 according to an exemplary embodiment.

FIG. 23 is a block diagram describing the demodulator of FIG. 21 according to an exemplary embodiment.

Referring to FIG. 23, the demodulator 4430 may include a frame demapper 4431, a BICM decoder 4432 for L1 signaling, a controller 4433, a BICM decoder 4434, and an output processor 4435.

The frame demapper 4431 selects OFDM cells constituting FEC blocks belonging to a selected PLP from a frame constituted with OFDM symbols based on controlling information delivered from the controller 4433, and delivers to the decoder 4434. Further, the frame demapper 4431 selects OFDM cells corresponding to more than one FEC block included in the L1 signaling, and delivers to BICM decoder 4432 for the L1 signaling.

The BICM decoder 4432 for the L1 signaling signal-processes the OFDM cells corresponding to the FEC blocks belonging to the L1 signaling, extracts L1 signaling bits, and delivers to the controller 4433. In this case, the signal processing may include extracting log-likelihood ratio (LLR) values for decoding low density parity check (LDPC) codes in OFDM cells, and decoding the LDPC codes by using the extracted LLR values.

The controller 4433 extracts an L1 signaling table from the L1 signaling bits, and controls operations of the frame demapper 4431, the BICM decoder 4434, and the output processor 4435 by using values of the L1 signaling table. FIG. 23 illustrates that the BICM decoder 4432 for the L1 signaling does not use controlling information of the controller 4433 for convenient explanation. However, if the L1 signaling includes a layer structure similar to the L1 pre-signaling and the L1 post-signaling described above, the BICM decoder 4432 for the L1 signaling may be constituted with more than one BICM decoding block, and operations of the BICM decoding blocks and the frame demapper 4431 may be controlled based on upper-layer L1 signaling information, as clearly understood in the above description.

The BICM decoder 4434 signal-processes the OFDM cells constituting FEC blocks belonging to the selected PLP, extracts baseband packets, and delivers the baseband packets to the output processor 4435. The signal processing may include extracting LLR values for coding and decoding LDPC codes in OFDM cells, and decoding the LDPC codes by using the extracted LLR values. These two operations may be performed based on the controlling information delivered from the controller 4433.

The output processor 4435 signal-processes the baseband packets, extracts a user packet, and delivers the extracted user packet to the service player. In this case, the signal processing may be performed on the controlling information delivered from the controller 4433.

According to an exemplary embodiment, the output processor 1235 may include an ALP packet processor (not illustrated) which extracts an ALP packet from a baseband packet.

Figure 24:
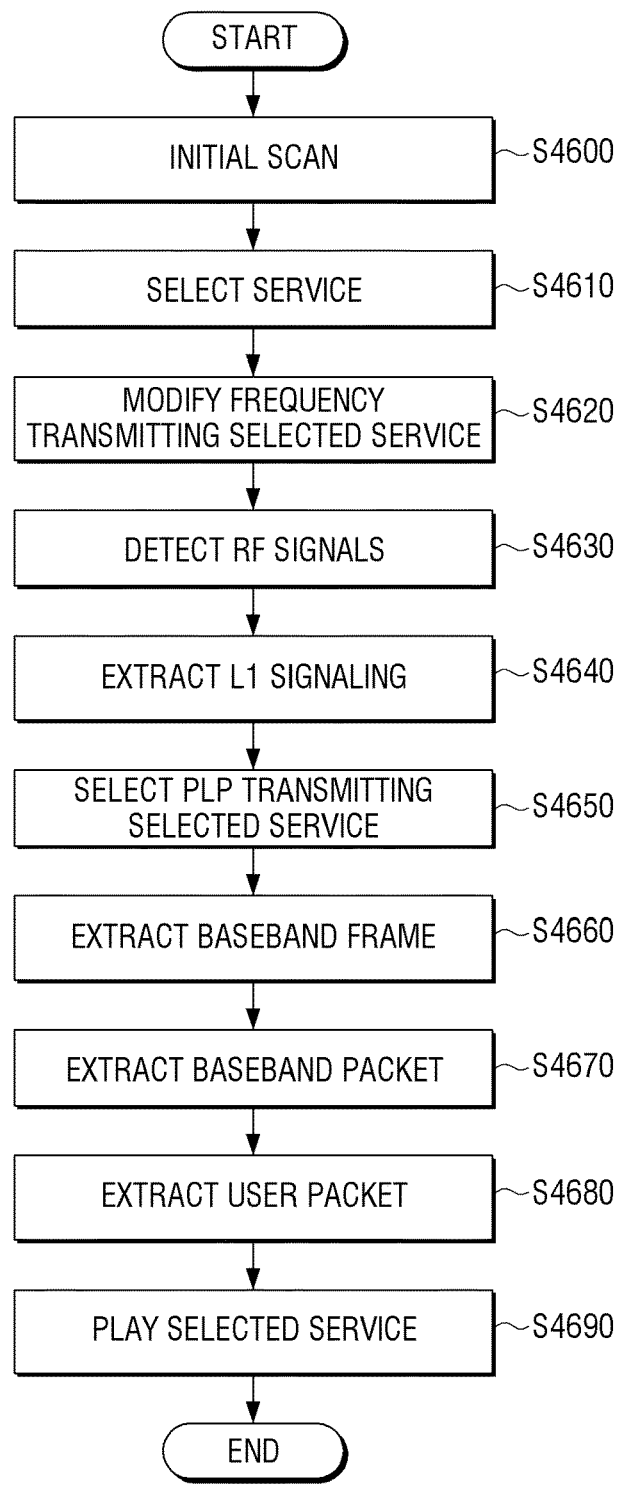
FIG. 24 is a flowchart provided to briefly explain an operation of a receiving apparatus from a time point when a user selects a service to a time point when the selected service is played.

FIG. 24 is a flowchart provided to briefly explain an operation of a receiving apparatus from a time point when a user selects a service to a time point when the selected service is played.

It is assumed that service information about all the services that can be selected at an initial scan process of S4600 is obtained prior to a service select process at S4610. The service information may include information about an RF channel and a PLP which transmits data required for playing a specific service in a current broadcasting system. One example of the service information may be Program-Specific Information/Service Information (PSI/SI) of an MPEG-2 TS, which may be usually obtained through L2 signaling and an upper layer signaling.

When a user selects a service at S4610, the receiving apparatus modifies a frequency transmitting the selected service at S4620, and performs extracting RF signals at S4630. While performing S4620 modifying the frequency transmitting the selected service, the service information may be used.

When the RF signals are extracted, the receiver performs S4640 extracting L1 signaling from the extracted RF signals. The receiving apparatus selects the PLP transmitting the selected service by using the extracted L1 signaling at S4650, and extracts baseband packets from the selected PLP at S4660. At S4650 selecting the PLP transmitting the selected service, the service information may be used.

Further, S4660 extracting the baseband packets may include selecting OFDM cells belonging to the PLP by demapping a transmission frame, extracting LLR values for coding/decoding LDPC, and decoding LDPC codes by using the extracted LLR values.

The receiving apparatus performs S4670 extracting an ALP packet from the extracted baseband packet by using header information about the extracted baseband packet, and performs S4680 extracting a user packet from the extracted ALP packet by using header information about the extracted baseband packet. The extracted user packet is used in S4690 playing the selected service. At S4670 extracting the ALP packet and at S4680 extracting the user packet, L1 signaling information obtained at S4640 extracting the L1 signaling may be used. In this case, a process of extracting the user packet from the ALP packet (restoring null TS packet and inserting a TS sync byte) is the same as described above. According to the exemplary embodiments as described above, various types of data may be mapped to a transmittable physical layer and data processing efficiency may be improved.

Figure 25:
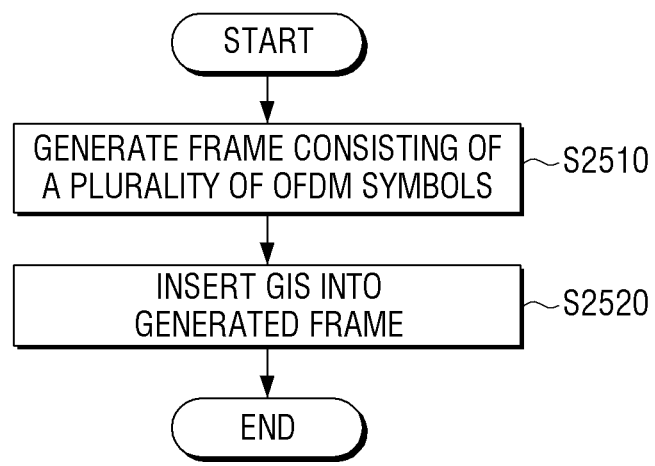
FIG. 25 is a flow chart illustrating a controlling method of a transmitting apparatus according to an exemplary embodiment.

FIG. 25 is a flow chart illustrating a controlling method of a transmitting apparatus according to an exemplary embodiment.

The controlling method of a transmitting apparatus illustrated in FIG. 25 includes generating the frame including the plurality of OFDM symbols (S2510).

Then, the controlling method of a transmitting apparatus includes inserting the GIs into the generated frame (S2520).

Here, the plurality of OFDM symbols are divided into the bootstrap, the preamble, and the payload, and in the inserting, the first GIs having the size corresponding to the FFT size of each of the OFDM symbols configuring the payload may be inserted into the front ends of each of the OFDM symbols, the second GIs having the size corresponding to the quotient obtained by dividing the extra region of the payload calculated based on the FFT size of the OFDM symbols configuring the payload, the number of OFDM symbols, and the size of the first GIs by the number of OFDM symbols may be inserted into the front ends of each of the first GIs, and the cyclic postfix (CP) having the size corresponding to the remainder remaining after dividing the extra region of the payload by the number of OFDM symbols may be inserted into the rear end of the final OFDM symbol configuring the payload.

Here, the CP may include portions of the final OFDM symbol configuring the payload.

In addition, the first and second GIs may include portions of each of the OFDM symbols.

In addition, the CP may include samples from a start point of the final OFDM symbol to a point corresponding to a size of the remainder, among a plurality of samples configuring the final OFDM symbol.

In addition, the first and second GIs may include samples from a final point of the OFDM symbol to a point corresponding to the sum of a size corresponding to the FFT size of the OFDM symbol and a size of the quotient, among a plurality of samples configuring the OFDM symbol.

In addition, in the inserting, the information on whether the extra region of the payload is distributed and the disposition reference of the extra region may be generated.

In addition, the controlling method of a transmitting apparatus according to an exemplary embodiment may further include transmitting the frame including the generated information.

Figure 26:
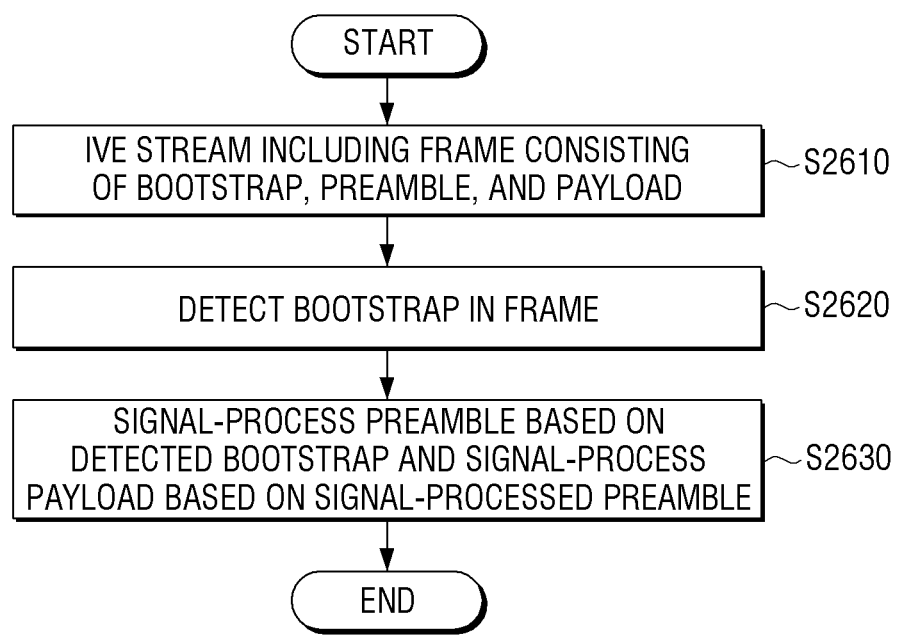
FIG. 26 is a flow chart illustrating a controlling method of a receiving apparatus according to an exemplary embodiment.

FIG. 26 is a flow chart illustrating a controlling method of a receiving apparatus according to an exemplary embodiment.

The controlling method of a receiving apparatus illustrated in FIG. 26 includes receiving the stream including the frame including the bootstrap, the preamble, and the payload (S2610).

Then, the controlling method of a receiving apparatus includes detecting the bootstrap in the frame (S2620).

Then, the controlling method of a receiving apparatus includes signal-processing the preamble based on the detected bootstrap, and signal-processing the payload based on the signal-processed preamble (S2630).

Here, the first GIs having the size corresponding to the FFT size of each of the OFDM symbols configuring the payload are inserted into the front ends of each of the OFDM symbols, the second GIs having the size corresponding to the quotient obtained by dividing the extra region of the payload calculated based on the FFT size of the OFDM symbols configuring the payload, the number of OFDM symbols, and the size of the first GIs by the number of OFDM symbols are inserted into the front ends of each of the first GIs, and the cyclic postfix (CP) having the size corresponding to the remainder remaining after dividing the extra region of the payload by the number of OFDM symbols is inserted into the rear end of the final OFDM symbol configuring the payload.

Here, in the signal-processing, the payload may be signal-processed based on the information on whether the extra region of the payload is distributed and the disposition reference of the extra region, included in the bootstrap and the preamble.

In addition, in the signal-processing, the channel estimation may be performed based on the CP inserted into the rear end of the final OFDM symbol.

A non-transitory computer readable medium in which a program sequentially performing a signal processing method according to the above exemplary embodiments is stored may be provided.

As an example, a non-transitory computer readable medium in which a program performing the generating of the frame including the plurality of OFDM symbols and the inserting of the GIs into the generated frame is stored may be provided.

In addition, as an example, a non-transitory computer readable medium in which a program performing the receiving of the stream including the frame including the bootstrap, the preamble, and the payload, the detecting of the bootstrap in the frame, and the signal-processing of the preamble based on the detected bootstrap and the signal-processing of the payload based on the signal-processed preamble is stored may be provided.

The non-transitory computer readable medium is not a medium that stores data therein for a while, such as a register, a cache, a memory, or the like, but means a medium that semi-permanently stores data therein and is readable by a device. In detail, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

At least one of the components, elements, modules or units represented by a block as illustrated in the drawings FIGS. 7, 8 and 20-23 may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

Although exemplary embodiments have been illustrated and described hereinabove, the present disclosure is not limited to the above-mentioned specific exemplary embodiments, but may be variously modified by those skilled in the art to which the present disclosure pertains without departing from the scope and spirit of the present disclosure as disclosed in the accompanying claims. These modifications should also be understood to fall within the scope of the present disclosure.

What is claimed is:

1. A transmitting apparatus comprising:
a frame generator configured to generate a frame comprising a plurality of orthogonal frequency-division multiplexing (OFDM) symbols; and
a guard interval inserter configured to insert one or more guard intervals (GIs) into the frame,
wherein the frame comprises a bootstrap, a preamble and a payload,
wherein the payload comprises at least one subframe,
wherein the one or more GIs comprise a first GI and a second GI,
wherein the first GI and the second GI are inserted into a front end of an OFDM symbol among OFDM symbols of the payload,
wherein a size of the first GI is obtained based on a Fast Fourier Transform (FFT) size of the at least one subframe,
wherein a size of the second GI is obtained based on a quotient which is obtained by dividing an extra part of the frame by a number of the OFDM symbols of the payload, and
wherein the extra part of the frame is obtained based on the FFT size of the at least one subframe, the number of the OFDM symbols of the payload, and the size of the first GI.

2. The transmitting apparatus as claimed in claim 1, wherein the one or more GIs comprise a cyclic postfix (CP),
wherein the cyclic postfix is inserted into a rear end of a final OFDM symbol of the payload, and
wherein a size of the CP is obtained based on a remainder which is obtained by dividing the extra part of the frame by the number of the OFDM symbols of the payload.

3. The transmitting apparatus as claimed in claim 2, wherein the CP comprises portions of the final OFDM symbol of the OFDM symbols of the payload.

4. The transmitting apparatus as claimed in claim 2, wherein the first GI and the second GI comprise portions of each of the OFDM symbols of the payload.

5. The transmitting apparatus as claimed in claim 3, wherein the CP comprises samples, among a plurality of samples of the final OFDM symbol of the OFDM symbols of the payload, from a start point of the final OFDM symbol to a point corresponding to a size of the remainder.

6. The transmitting apparatus as claimed in claim 4, wherein the first GI and the second GI comprise samples, among a plurality of samples of each of the OFDM symbols of the payload, from a final point of each of the OFDM symbols of the payload to a point corresponding to a sum of a size corresponding to the FFT size of the at least one subframe and a size of the quotient.

7. The transmitting apparatus as claimed in claim 1, wherein the frame comprises information on whether the extra part of the frame is distributed and information on a disposition reference of the extra part.

8. The transmitting apparatus as claimed in claim 7, further comprising;
 a transmitter configured to transmit the frame including the information.

9. The transmitting apparatus as claimed in claim 1, wherein the second GI is inserted into a front end of the first GI.

10. The transmitting apparatus as claimed in claim 1, wherein a length of the frame is a predetermined length.

\* \* \* \* \*